(12) United States Patent
Kanno et al.

(10) Patent No.: US 10,443,525 B2
(45) Date of Patent: Oct. 15, 2019

(54) EXHAUST EMISSION CONTROL SYSTEM OF ENGINE

(71) Applicant: Mazda Motor Corporation, Aki-gun, Hiroshima (JP)

(72) Inventors: Masanobu Kanno, Hiroshima (JP); Masayuki Tetsuno, Hiroshima (JP); Takayuki Yamaguchi, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 240 days.

(21) Appl. No.: 15/641,501

(22) Filed: Jul. 5, 2017

(65) Prior Publication Data

US 2018/0038302 A1    Feb. 8, 2018

(30) Foreign Application Priority Data

Aug. 2, 2016 (JP) .................. 2016-151676
Aug. 2, 2016 (JP) .................. 2016-151677

(51) Int. Cl.
*F02D 41/14* (2006.01)
*F01N 13/00* (2010.01)
(Continued)

(52) U.S. Cl.
CPC ..... *F02D 41/1454* (2013.01); *B01D 53/9418* (2013.01); *B01D 53/9431* (2013.01);
(Continued)

(58) Field of Classification Search
CPC ...... F02D 41/14; F02D 41/02; F02D 41/1454; F02D 41/1441; F02D 41/1445;
(Continued)

(56) References Cited

U.S. PATENT DOCUMENTS 6,487,851 B1    12/2002  Okada et al.
6,732,507 B1 *  5/2004   Stanglmaier ............ F01N 3/035
                                                          60/280
(Continued)

FOREIGN PATENT DOCUMENTS

JP    2003206727 A    7/2003
JP    2004360593 A    12/2004
(Continued)

*Primary Examiner* — Patrick D Maines
(74) *Attorney, Agent, or Firm* — Alleman Hall Creasman & Tuttle LLP

(57) ABSTRACT

An exhaust emission control system of an engine, including an $NO_x$ catalyst disposed in an exhaust passage for storing $NO_x$ within exhaust gas when an air-fuel ratio of the exhaust gas is lean, and reducing the stored $NO_x$ when the air-fuel ratio is approximately stoichiometric or rich, is provided. The system includes an SCR catalyst disposed in the exhaust passage downstream of the $NO_x$ catalyst and for purifying $NO_x$ within exhaust gas by causing a reaction with ammonia, a controller executing a $NO_x$ reduction controlling module for executing a control in which the air-fuel ratio is controlled to a target air-fuel ratio so that the stored $NO_x$ is reduced, and an ammonia adsorption amount acquiring module for acquiring an ammonia adsorption amount of the SCR catalyst by detection or estimation. The $NO_x$ reduction controlling module controls the target air-fuel ratio to be leaner as the ammonia adsorption amount increases.

14 Claims, 14 Drawing Sheets

(51) Int. Cl.
*B01D 53/94* (2006.01)
*F01N 3/08* (2006.01)
*F01N 3/20* (2006.01)
*F01N 9/00* (2006.01)
*F02D 41/00* (2006.01)
*F02D 41/02* (2006.01)
*F02D 41/10* (2006.01)
*F02D 41/40* (2006.01)
*F02D 41/38* (2006.01)

(52) U.S. Cl.
CPC ....... *B01D 53/9495* (2013.01); *F01N 3/0814* (2013.01); *F01N 3/0842* (2013.01); *F01N 3/208* (2013.01); *F01N 3/2066* (2013.01); *F01N 9/00* (2013.01); *F01N 13/009* (2014.06); *F02D 41/0002* (2013.01); *F02D 41/0007* (2013.01); *F02D 41/0047* (2013.01); *F02D 41/025* (2013.01); *F02D 41/0275* (2013.01); *F02D 41/0295* (2013.01); *F02D 41/10* (2013.01); *F02D 41/1461* (2013.01); *F02D 41/405* (2013.01); *B01D 53/9477* (2013.01); *B01D 2251/2067* (2013.01); *B01D 2255/2065* (2013.01); *B01D 2255/20707* (2013.01); *B01D 2255/20738* (2013.01); *B01D 2255/20776* (2013.01); *B01D 2255/50* (2013.01); *B01D 2255/91* (2013.01); *B01D 2255/911* (2013.01); *B01D 2257/404* (2013.01); *B01D 2257/502* (2013.01); *B01D 2257/702* (2013.01); *B01D 2258/012* (2013.01); *F01N 2240/25* (2013.01); *F01N 2430/06* (2013.01); *F01N 2570/14* (2013.01); *F01N 2610/02* (2013.01); *F01N 2900/0422* (2013.01); *F01N 2900/1602* (2013.01); *F01N 2900/1622* (2013.01); *F01N 2900/1624* (2013.01); *F01N 2900/1812* (2013.01); *F02D 2041/389* (2013.01); *F02D 2200/0802* (2013.01); *F02D 2200/0806* (2013.01); *F02D 2200/101* (2013.01); *F02D 2200/501* (2013.01); *F02D 2200/602* (2013.01); *F02D 2250/36* (2013.01); *Y02A 50/2325* (2018.01); *Y02T 10/144* (2013.01); *Y02T 10/24* (2013.01); *Y02T 10/26* (2013.01); *Y02T 10/44* (2013.01); *Y02T 10/47* (2013.01)

(58) Field of Classification Search
CPC .......... F02D 41/0295; F02D 2200/014; F01N 11/00; F01N 3/28; F01N 3/2892; F01N 11/007

See application file for complete search history.

(56) References Cited

U.S. PATENT DOCUMENTS

| | | | | |
|---|---|---|---|---|
| 2002/0038544 | A1* | 4/2002 | Ikemoto | F02D 41/123 60/285 |
| 2004/0168431 | A1* | 9/2004 | Goralski, Jr. | F02D 41/0275 60/286 |
| 2007/0113538 | A1* | 5/2007 | Kato | F01N 3/0864 60/276 |
| 2007/0256405 | A1* | 11/2007 | Gabe | B01D 53/9431 60/274 |
| 2015/0345358 | A1* | 12/2015 | Sakurai | F02D 41/1454 60/278 |
| 2016/0115891 | A1 | 4/2016 | Suzuki | |
| 2017/0363029 | A1* | 12/2017 | Boerensen | F01N 3/0842 |
| 2018/0023437 | A1* | 1/2018 | Suzuki | F01N 3/101 60/274 |

FOREIGN PATENT DOCUMENTS

| | | | |
|---|---|---|---|
| JP | 2009156108 A | | 7/2009 |
| JP | 2010112345 A | | 5/2010 |
| JP | 2010116784 A | * | 5/2010 |
| JP | 2010116784 A | | 5/2010 |
| JP | 2012127295 A | | 7/2012 |
| JP | 2013170565 A | | 9/2013 |
| JP | 2014214730 A | | 11/2014 |
| JP | 2016079856 A | | 5/2016 |
| WO | 2015004779 A1 | | 1/2015 |

\* cited by examiner

EXHAUST EMISSION CONTROL SYSTEM OF ENGINE

BACKGROUND

The present invention relates to an exhaust emission control system of an engine, and particularly to an exhaust emission control system which is provided in an exhaust passage with an $NO_x$ catalyst and an SCR (Selective Catalytic Reduction) catalyst which purify $NO_x$ in exhaust gas.

Conventionally, $NO_x$ storage catalysts which store (occlude) $NO_x$ contained in exhaust gas when an air-fuel ratio of the exhaust gas is lean (i.e., $\lambda>1$, larger than a theoretical air-fuel ratio) are known. Such $NO_x$ storage catalysts further reduce the stored $NO_x$ when the air-fuel ratio is approximately equal to stoichiometric (i.e., $\lambda\approx 1$, approximately equal to the theoretical air-fuel ratio) or is rich (i.e., $\lambda<1$, smaller than the theoretical air-fuel ratio). Within a normal operating range of an engine, the engine is operated at the lean air-fuel ratio ($\lambda>1$) so as to reduce fuel consumption, although if this lean operation state continues for a while, the amount of stored $NO_x$ in the $NO_x$ catalyst reaches a limit value and the $NO_x$ catalyst can no longer store $NO_x$, which causes $NO_x$ to be released. For this reason, the air-fuel ratio is suitably set to be stoichiometric or richer ($\lambda\leq 1$) in order to reduce $NO_x$ stored in the $NO_x$ catalyst (hereinafter, the control for reducing $NO_x$ stored in the $NO_x$ catalyst is referred to as "$NO_x$ reduction control"). For example, JP2004-360593A discloses an art for enriching an air-fuel ratio of exhaust gas so as to reduce $NO_x$ stored in an $NO_x$ catalyst when the stored amount of $NO_x$ is above a predetermined amount. It will be noted that "$\lambda$" is an index of the air-fuel ratio expressed with reference to the theoretical air-fuel ratio, and is a so-called air excess ratio.

Further, an exhaust emission control system has been recently developed to be equipped not only with such a $NO_x$ catalyst, but also with an SCR catalyst for selectively reducing and purifying $NO_x$ within exhaust gas while using ammonia ($NH_3$) as a reducing agent. Generally, urea water is injected into an exhaust passage upstream of the SCR catalyst and the SCR catalyst purifies $NO_x$ by using ammonia generated by urea water. On the other hand, since ammonia is generated when reducing $NO_x$ stored in the $NO_x$ catalyst, it is also known to purify $NO_x$ in the SCR catalyst by using ammonia generated in the $NO_x$ catalyst. For example, JP2010-112345A discloses an exhaust emission control system for controlling an SCR catalyst to adsorb ammonia generated in an $NO_x$ catalyst during an $NO_x$ reduction control, and purifying $NO_x$ using the adsorbed ammonia. The exhaust emission control system executes the $NO_x$ reduction control only when the adsorbed amount of ammonia in the SCR catalyst is below a predetermined amount, whereas the $NO_x$ reduction control is prohibited when the adsorbed amount of ammonia exceeds the predetermined amount, so as to avoid supplying more than an adsorbable amount of ammonia to the SCR catalyst and causing release (slipping out) of ammonia from the SCR catalyst.

However, with the art described in JP2010-112345A, since the $NO_x$ reduction control is prohibited whenever the adsorbed amount of ammonia in the SCR catalyst is large, the frequency of executing the $NO_x$ reduction control is limited, and thus the $NO_x$ purification performance of the $NO_x$ catalyst tends to be insufficient. Therefore, it is considered ideal when it is possible to control the release of ammonia from the SCR catalyst resulting from the $NO_x$ reduction control, while appropriately ensuring the execution of the $NO_x$ reduction control even when the ammonia adsorption amount in the SCR catalyst is large, without prohibiting the $NO_x$ reduction control as described above.

SUMMARY

The present invention is made in view of solving the problems of the conventional arts described above, and aims to provide an exhaust emission control system of an engine, which includes an $NO_x$ catalyst and an SCR catalyst, which controls the release of ammonia from the SCR catalyst resulting from the $NO_x$ reduction control, while appropriately ensuring the execution of the $NO_x$ reduction control even when an adsorbed amount of ammonia in the SCR catalyst is large.

According to one aspect of the present invention, an exhaust emission control system of an engine, including an $NO_x$ catalyst disposed in an exhaust passage of the engine and configured to store $NO_x$ within exhaust gas when an air-fuel ratio of the exhaust gas is lean, and reducing the stored $NO_x$ when the air-fuel ratio is approximately stoichiometric or rich, is provided. The system includes an SCR catalyst disposed in the exhaust passage downstream of the $NO_x$ catalyst and configured to purify $NO_x$ within exhaust gas by causing a reaction with ammonia, and a controller. The controller is configured to execute an $NO_x$ reduction controlling module for executing an $NO_x$ reduction control in which the air-fuel ratio is controlled to a target air-fuel ratio so that the stored $NO_x$ is reduced, the target air-fuel ratio being a ratio at which the stored $NO_x$ is reducible. The $NO_x$ reduction controlling module sets a first air-fuel ratio that is rich as the target air-fuel ratio until a predetermined time period passes from start of the $NO_x$ reduction control, and sets a second air-fuel ratio as the target air-fuel ratio, the second air-fuel ratio being leaner than the first air-fuel ratio within a range where the stored $NO_x$ is reducible, the predetermined time period being at least longer than a time period from the start of the $NO_x$ reduction control until oxygen stored in the $NO_x$ catalyst is consumed by the $NO_x$ reduction control.

With this configuration, the predetermined time period is set at least longer than the time for oxygen stored in the $NO_x$ catalyst to be consumed by the $NO_x$ reduction control, and the $NO_x$ reduction control is executed applying the rich first air-fuel ratio until the predetermined time period passes. Therefore, the $NO_x$ reduction efficiency of the $NO_x$ catalyst is improved while suitably preventing the ammonia generated in the $NO_x$ catalyst by the $NO_x$ reduction from being released from the SCR catalyst without being adsorbed.

Further, after the predetermined time period passes, the $NO_x$ reduction control is executed applying the lean second air-fuel ratio. The execution of the $NO_x$ reduction control on the $NO_x$ catalyst is suitably ensured while preventing the release of ammonia from the SCR catalyst due to the $NO_x$ reduction control. Therefore, even after the predetermined time period passes, $NO_x$ purification performance is suitably ensured by reducing the $NO_x$ stored amount in the $NO_x$ catalyst.

The controller may be configured to further execute an ammonia adsorption amount acquiring module for acquiring an ammonia adsorption amount of the SCR catalyst by one of detection and estimation. The $NO_x$ reduction controlling module may set the predetermined time period based on the ammonia adsorption amount acquired by the ammonia adsorption amount acquiring module.

With this configuration, the predetermined time period may be determined so as to apply the first air-fuel ratio as long as possible while taking into consideration the possibility of the SCR catalyst releasing, due to the $NO_x$ reduction control, ammonia corresponding to the ammonia adsorption amount of the SCR catalyst.

The $NO_x$ reduction controlling module may shorten the predetermined time period as the ammonia adsorption amount increases.

With this configuration, since the predetermined time period is shortened as the ammonia adsorption amount increases (i.e., the predetermined time period is extended as the ammonia adsorption amount decreases), the $NO_x$ reduction efficiency of the $NO_x$ catalyst is effectively improved. As a result, during the predetermined time period, the $NO_x$ stored amount in the $NO_x$ catalyst is swiftly reduced and the $NO_x$ purification performance of the $NO_x$ catalyst is effectively ensured.

The $NO_x$ reduction controlling module may set a shortest time for the predetermined time period as the time from the start of the $NO_x$ reduction control until oxygen stored in the $NO_x$ catalyst is consumed by the $NO_x$ reduction control, and extend the predetermined time period from the shortest time as the ammonia adsorption amount decreases.

When the $NO_x$ stored amount in the $NO_x$ catalyst is above a predetermined amount, the $NO_x$ reduction controlling module may continuously execute the $NO_x$ reduction control to control the air-fuel ratio to the target air-fuel ratio so that the $NO_x$ stored amount falls below a predetermined amount by reducing the $NO_x$ stored in the $NO_x$ catalyst.

With this configuration, the switch of the target air-fuel ratio based on such a predetermined time period as described above is applied to the $NO_x$ reduction control executed when the $NO_x$ stored amount in the $NO_x$ catalyst is above the predetermined amount. Thus, the $NO_x$ stored amount in the $NO_x$ catalyst is efficiently reduced to fall below the predetermined amount.

The $NO_x$ reduction controlling module may execute, as the $NO_x$ reduction control, (1) a first $NO_x$ reduction control in which the air-fuel ratio is controlled to the target air-fuel ratio when the air-fuel ratio becomes rich due to acceleration of a vehicle, and (2) a second $NO_x$ reduction control in which the air-fuel ratio is controlled to the target air-fuel ratio so that the $NO_x$ stored amount in the $NO_x$ catalyst falls below a predetermined amount by reducing the $NO_x$ stored in the $NO_x$ catalyst when the $NO_x$ stored amount in the $NO_x$ catalyst is above a predetermined amount regardless of whether or not the air-fuel ratio becomes rich due to acceleration of the vehicle. The $NO_x$ reduction controlling module may extend the predetermined time period to be longer in the first $NO_x$ reduction control than in the second $NO_x$ reduction control.

With this configuration, the $NO_x$ reduction efficiency of the $NO_x$ catalyst in the first $NO_x$ reduction control which tends to be executed more frequently than the second $NO_x$ reduction control is improved to efficiently reduce the $NO_x$ stored amount in the $NO_x$ catalyst.

The $NO_x$ reduction controlling module may execute, as the $NO_x$ reduction control, (1) a first $NO_x$ reduction control in which the air-fuel ratio is controlled to the target air-fuel ratio when the air-fuel ratio becomes rich due to acceleration of a vehicle, and (2) a second $NO_x$ reduction control in which the air-fuel ratio is controlled to the target air-fuel ratio so that the $NO_x$ stored amount in the $NO_x$ catalyst falls below a predetermined amount by reducing the $NO_x$ stored in the $NO_x$ catalyst when the $NO_x$ stored amount in the $NO_x$ catalyst is above a predetermined amount regardless of whether or not the air-fuel ratio becomes rich due to acceleration of the vehicle. Only when the second $NO_x$ reduction control is executed, the $NO_x$ reduction controlling module may set the first air-fuel ratio as the target air-fuel ratio for the predetermined time period from the start of the second $NO_x$ reduction control, and then sets the second air-fuel ratio as the target air-fuel ratio after the predetermined time period has passed.

With this configuration, the switch of the target air-fuel ratio based on such a predetermined time as described above is applied only to the second $NO_x$ reduction control executed when the $NO_x$ stored amount in the $NO_x$ catalyst is above the predetermined amount. Thus, the $NO_x$ stored amount in the $NO_x$ catalyst is efficiently reduced to fall below the predetermined amount.

When the first $NO_x$ reduction control is executed, the $NO_x$ reduction controlling module may continuously control the air-fuel ratio to the target air-fuel ratio according to the ammonia adsorption amount of the SCR catalyst, the target air-fuel ratio being set leaner within a range where the stored $NO_x$ is reducible, as the ammonia adsorption amount increases.

With this configuration, when the first $NO_x$ reduction control is executed, the target air-fuel ratio is continuously controlled to be rich when the ammonia adsorption amount of the SCR catalyst is small. Therefore, the $NO_x$ reduction efficiency of the first $NO_x$ reduction control is improved, the $NO_x$ stored amount in the $NO_x$ catalyst is swiftly reduced, and the $NO_x$ purification performance of the $NO_x$ catalyst is effectively ensured. On the other hand, when the ammonia adsorption amount of the SCR catalyst is large, the target air-fuel ratio is continuously controlled to be lean. Therefore, the execution of the first $NO_x$ reduction control is suitably ensured while preventing the release of ammonia from the SCR catalyst due to the $NO_x$ reduction.

According to another aspect of the present invention, an exhaust emission control system of an engine, including an $NO_x$ catalyst disposed in an exhaust passage of the engine and configured to store $NO_x$ within exhaust gas when an air-fuel ratio of the exhaust gas is lean, and reducing the stored $NO_x$ when the air-fuel ratio is approximately stoichiometric or rich, is provided. The system includes an SCR catalyst disposed in the exhaust passage downstream of the $NO_x$ catalyst and configured to purify $NO_x$ within exhaust gas by causing a reaction with ammonia, and a controller. The controller is configured to execute an $NO_x$ reduction controlling module for executing an $NO_x$ reduction control in which the air-fuel ratio is controlled to a target air-fuel ratio so that the stored $NO_x$ is reduced, the target air-fuel ratio being a ratio at which the stored $NO_x$ is reducible. The controller is further configured to execute an ammonia adsorption amount acquiring module for acquiring an ammonia adsorption amount of the SCR catalyst by one of detection and estimation. The $NO_x$ reduction controlling module controls the target air-fuel ratio to be leaner as the ammonia adsorption amount increases.

With this configuration, the target air-fuel ratio applied in the $NO_x$ reduction control is set leaner as the ammonia adsorption amount in the SCR catalyst increases. Thus, the $NO_x$ reduction control of the $NO_x$ catalyst is suitably ensured while preventing the ammonia generated in the $NO_x$ catalyst by the $NO_x$ reduction control from being released without being sufficiently adsorbed by the SCR catalyst. Therefore, even when the ammonia adsorption amount of the SCR catalyst is large, the amount of stored $NO_x$ in the $NO_x$ catalyst is reduced to suitably ensure the $NO_x$ purification performance of the $NO_x$ catalyst. On the other hand, when the ammonia adsorption amount of the SCR catalyst is small, the rich target air-fuel ratio is applied to the $NO_x$ reduction control so as to improve the $NO_x$ reduction efficiency of the $NO_x$ catalyst in the $NO_x$ reduction control. As a result, the amount of stored $NO_x$ in the $NO_x$ catalyst is swiftly reduced to effectively ensure the $NO_x$ purification performance of the $NO_x$ catalyst.

When the amount of stored $NO_x$ in the $NO_x$ catalyst is above a predetermined amount, the $NO_x$ reduction controlling module may execute the $NO_x$ reduction control to continuously control the air-fuel ratio to the target air-fuel ratio so that the amount of stored $NO_x$ falls below the predetermined amount by reducing the $NO_x$ stored in the $NO_x$ catalyst.

With this configuration, the $NO_x$ reduction control is executed when the amount of stored $NO_x$ in the $NO_x$ catalyst is above the predetermined amount, and this execution is ensured regardless of the ammonia adsorption amount of the SCR catalyst. Therefore, the amount of stored $NO_x$ in the $NO_x$ catalyst is suitably reduced to fall below the predetermined amount.

The $NO_x$ reduction controlling module may execute the $NO_x$ reduction control to temporarily control the air-fuel ratio to the target air-fuel ratio when the air-fuel ratio becomes rich due to acceleration of a vehicle.

With this configuration, the $NO_x$ reduction control is executed when the air-fuel ratio becomes rich due to acceleration of the vehicle, and this execution is ensured regardless of the ammonia adsorption amount of the SCR catalyst. Therefore, the amount of stored $NO_x$ in the $NO_x$ catalyst is efficiently reduced while preventing a fuel consumption increase.

The $NO_x$ reduction controlling module may execute, as the $NO_x$ reduction control, (1) a first $NO_x$ reduction control in which the air-fuel ratio is temporarily controlled to the target air-fuel ratio when the air-fuel ratio becomes rich due to acceleration of a vehicle, and (2) a second $NO_x$ reduction control in which the air-fuel ratio is continuously controlled to the target air-fuel ratio so that the amount of stored $NO_x$ falls below a predetermined amount by reducing the $NO_x$ stored in the $NO_x$ catalyst when the amount of stored $NO_x$ in the $NO_x$ catalyst is above a predetermined amount regardless of whether or not the air-fuel ratio becomes rich due to acceleration of the vehicle. The $NO_x$ reduction controlling module may execute the first $NO_x$ reduction control so as to control the target air-fuel ratio to be richer in the first $NO_x$ reduction control than in the second $NO_x$ reduction control for the same ammonia adsorption amount.

With this configuration, since the target air-fuel ratio in the first $NO_x$ reduction control is set to be richer than in the second $NO_x$ reduction control when the ammonia adsorption amount is the same, the $NO_x$ reduction efficiency of the $NO_x$ catalyst in the first $NO_x$ reduction control is suitably improved.

The $NO_x$ reduction controlling module may control the target air-fuel ratio to be leaner as the ammonia adsorption amount increases.

With this configuration, the release of the ammonia from the SCR catalyst caused by the $NO_x$ reduction control is effectively prevented.

The $NO_x$ reduction controlling module may control the target air-fuel ratio to be substantially fixed when the ammonia adsorption amount is above a predetermined adsorption amount.

With this configuration, a substantially fixed target air-fuel ratio is applied over a relatively wide range where the ammonia adsorption amount of the SCR catalyst is large. Therefore, the release of ammonia from the SCR catalyst caused by the $NO_x$ reduction control is reliably prevented regardless of the ammonia adsorption performance of the SCR catalyst which changes in various situations.

The $NO_x$ reduction controlling module may control the target air-fuel ratio to be leaner as the temperature of the SCR catalyst increases at the same ammonia adsorption amount.

With this configuration, by setting the lean target air-fuel ratio when the temperature of the SCR catalyst is high, the release of ammonia from the SCR catalyst caused by the $NO_x$ reduction control is reliably prevented, although usually the ammonia adsorption performance of the SCR catalyst degrades and it becomes easy for ammonia to be released from the SCR catalyst. On the other hand, by setting the rich target air-fuel ratio when the temperature of the SCR catalyst is low, since it becomes hard for ammonia to be released from the SCR catalyst, the $NO_x$ reduction efficiency of the $NO_x$ catalyst is suitably improved.

The system may further include a urea injector disposed in the exhaust passage upstream of the SCR catalyst and configured to inject urea into the exhaust passage. The SCR catalyst may purify $NO_x$ by using ammonia generated from urea injected by the urea injector. The ammonia adsorption amount acquiring module may estimate the ammonia adsorption amount based on an amount of ammonia supplied to the SCR catalyst by the urea injection by the urea injector, an amount of ammonia generated in the $NO_x$ catalyst by the $NO_x$ reduction control, and an amount of ammonia consumed by the SCR catalyst to purify $NO_x$.

With this configuration, the ammonia adsorption amount of the SCR catalyst is estimated accurately.

DETAILED DESCRIPTION OF EMBODIMENT

Hereinafter, an exhaust emission control system of an engine according to one embodiment of the present invention is described with reference to the accompanying drawings.

<System Configuration>

First, an engine system to which the exhaust emission control system of the engine of this embodiment is applied is described with reference to a schematic configuration view of the engine system in FIG. 1.

Figure 1:
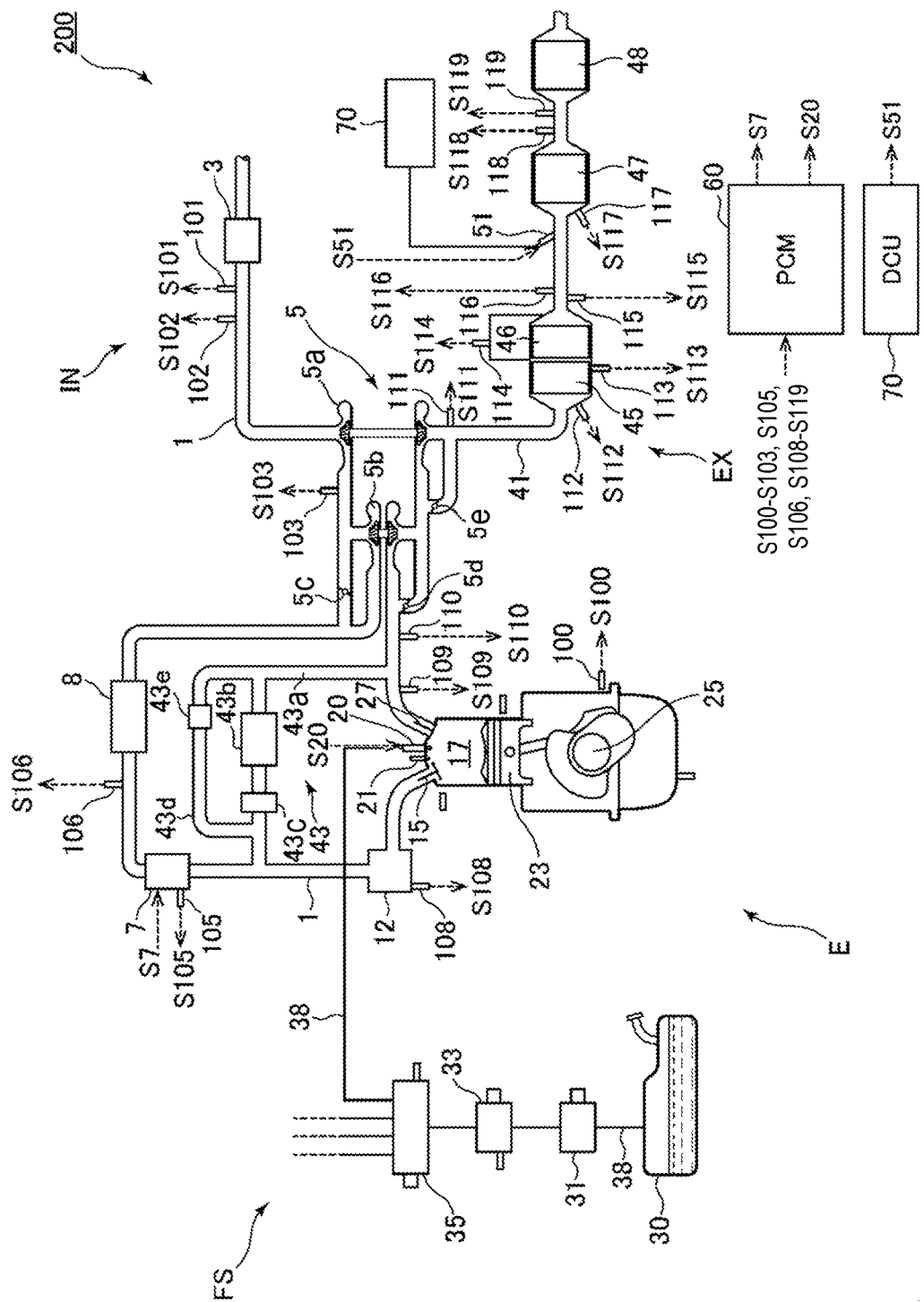
FIG. 1 is a view illustrating a schematic configuration of an engine system to which an exhaust emission control system of an engine according to one embodiment of the present invention is applied.

As illustrated in FIG. 1, the engine system 200 mainly includes a diesel engine as an engine E, an intake system IN for supplying intake air into the engine E, a fuel supply system FS for supplying fuel into the engine E, an exhaust system EX for discharging exhaust gas from the engine E, sensors 100 to 103, 105, 106 and 108 to 119 for detecting various states relating to the engine system 200, a PCM (Power-train Control Module) 60 for controlling the engine system 200, and a DCU (Dosing Control Unit) 70 for executing a control relating to an SCR (Selective Catalytic Reduction) catalyst 47.

First, the intake system IN includes an intake passage 1 through which intake air passes. In the intake passage 1, an air cleaner 3 for purifying air introduced from outside, a compressor of a turbocharger 5 for compressing intake air passing therethrough to increase pressure of the intake air, an intercooler 8 for cooling the intake air with outdoor air or cooling water, an intake shutter valve 7 (corresponding to a throttle valve) for adjusting a flow rate of intake air passing therethrough, and a surge tank 12 for temporarily storing intake air to be supplied into the engine E are provided in this order from the upstream side.

Further in the intake system IN, an airflow sensor 101 for detecting an intake air amount and a temperature sensor 102 for detecting an intake air temperature are disposed in the intake passage 1 immediately downstream of the air cleaner 3. A pressure sensor 103 for detecting pressure of the intake air is provided to the turbocharger 5. A temperature sensor 106 for detecting an intake air temperature is disposed in the intake passage 1 immediately downstream of the intercooler 8. A position sensor 105 for detecting an opening of the intake shutter valve 7 is provided to the intake shutter valve 7. A pressure sensor 108 for detecting pressure of intake air in an intake manifold is provided to the surge tank 12. The various sensors 101 to 103, 105, 106 and 108 provided in the intake system IN output detection signals S101 to S103, S105, S106 and S108 corresponding to the detected parameters to the PCM 60, respectively.

Next, the engine E includes an intake valve 15 for introducing the intake air supplied from the intake passage 1 (more specifically, intake manifold) into a combustion chamber 17, a fuel injector 20 for injecting fuel to the combustion chamber 17, a glow plug 21 provided with a heat generating part 21a for generating heat when energized, a piston 23 for reciprocating due to combustion of air-fuel mixture within the combustion chamber 17, a crankshaft 25 for rotating due to the reciprocation of the piston 23, and an exhaust valve 27 for discharging the exhaust gas generated by the combustion of the air-fuel mixture within the combustion chamber 17 to an exhaust passage 41. The engine E is also provided with a crank angle sensor 100 for detecting a crank angle which is a rotational angle of the crankshaft 25 measured, for example, with reference to a top dead center. The crank angle sensor 100 outputs a detection signal S100 corresponding to the detected crank angle to the PCM 60 which acquires an engine speed based on the detection signal S100.

The fuel supply system FS has a fuel tank 30 for storing the fuel and a fuel supply passage 38 for supplying the fuel from the fuel tank 30 to the fuel injector 20. In the fuel supply passage 38, a low-pressure fuel pump 31, a high-pressure fuel pump 33, and a common rail 35 are disposed in this order from the upstream side.

Next, the exhaust system EX includes the exhaust passage 41 through which the exhaust gas passes. In the exhaust passage 41, a turbine of the turbocharger 5 which is rotated by the exhaust gas passing therethrough and drives the compressor by this rotation is disposed. Further the following components are disposed in the exhaust passage 41 on the downstream side of the turbine in the following order from the upstream: an $NO_x$ catalyst 45 for purifying $NO_x$ within the exhaust gas; a diesel particulate filter (DPF) 46 for capturing particulate matter (PM) within the exhaust gas; a urea injector 51 for injecting urea (typically, urea water) into the exhaust passage 41 downstream of the DPF 46; the SCR catalyst 47 for producing ammonia by hydrolysis of urea injected by the urea injector 51 and purifying $NO_x$ by causing a reaction (reduction) of this ammonia with $NO_x$ within the exhaust gas; and a slip catalyst 48 for oxidizing ammonia released from the SCR catalyst 47 to purify it. It will be noted that the urea injector 51 is controlled to inject urea into the exhaust passage 41 based on a control signal S51 supplied from the DCU 70.

Here, the $NO_x$ catalyst 45 and the SCR catalyst 47 are described more in detail. The $NO_x$ catalyst 45 is an $NO_x$ storage catalyst (NSC) which stores $NO_x$ contained within the exhaust gas when an air-fuel ratio of the exhaust gas is lean (i.e., $\lambda>1$, larger than a theoretical air-fuel ratio), and reduces the stored $NO_x$ when the air-fuel ratio is approximately equal to stoichiometric (i.e., $\lambda\approx1$, approximately equal to the theoretical air-fuel ratio) or is rich (i.e., $\lambda<1$, smaller than the theoretical air-fuel ratio). The $NO_x$ catalyst 45 generates ammonia when reducing the stored NOR, and releases it. For example, in the $NO_x$ reduction control, ammonia ($NH_3$) is generated by combining "N" within $NO_x$ stored in the $NO_x$ catalyst 45 and "H" within "HC," such as unburned fuel supplied to the $NO_x$ catalyst 45 as a reducing agent.

The $NO_x$ catalyst 45 functions, not only as the NSC, but also as a diesel oxidation catalyst (DOC) which oxidizes hydrocarbon (HC), carbon monoxide (CO), etc. using oxygen within the exhaust gas to convert them into water and carbon dioxide. For example, the NOR catalyst 45 is made by coating a surface of a catalyst material layer of the DOC with a catalyst material of NSC.

On the other hand, the SCR catalyst 47 adsorbs ammonia generated by urea injected from the urea injector 51 and ammonia generated by the $NO_x$ reduction in the $NO_x$ catalyst 45, and causes reaction of the adsorbed ammonia with $NO_x$ to reduce and purify NOR. For example, the SCR catalyst 47 is made by supporting catalyst metal which reduces $NO_x$ with ammonia on a zeolite which traps ammonia to form a catalyst component, and supporting this catalyst component on a cell wall of a honeycomb carrier. Fe, Ti, Ce, W etc. is used as the catalyst metal for $NO_x$ reduction.

It will be noted that, in view of both ensuring $NO_x$ purification performance by the SCR catalyst 47 and preventing the release (slip) of ammonia from the SCR catalyst 47, the DCU 70 controls the urea injector 51 to inject urea so that a suitable amount of ammonia is adsorbed to the SCR catalyst 47. In this case, since the ammonia adsorption performance changes according to the temperature of the SCR catalyst 47 (specifically, it becomes easier for ammonia to be released from the SCR catalyst 47 as the temperature of the SCR catalyst 47 increases), the DCU 70 controls the urea injector 51 to inject urea in consideration of the temperature of the SCR catalyst 47.

Further in the exhaust system EX, as illustrated in FIG. 1, a pressure sensor 109 for detecting pressure of the exhaust gas and a temperature sensor 110 for detecting an exhaust gas temperature are disposed in the exhaust passage 41 upstream of the turbine of the turbocharger 5. An O2 sensor 111 for detecting an oxygen concentration within the exhaust gas is disposed in the exhaust passage 41 immediately downstream of the turbine of the turbocharger 5. Moreover, the exhaust system EX includes a temperature sensor 112 for detecting an exhaust gas temperature at a position immediately upstream of the $NO_x$ catalyst 45, a temperature sensor 113 for detecting an exhaust gas temperature at a position between the $NO_x$ catalyst 45 and the DPF 46, a pressure difference sensor 114 for detecting a pressure difference of exhaust gas between positions immediately upstream and downstream of the DPF 46, a temperature sensor 115 for detecting an exhaust gas temperature at a position immediately downstream of the DPF 46, an $NO_x$ sensor 116 for detecting a concentration of $NO_x$ within the exhaust gas at a position immediately downstream of the DPF 46, a temperature sensor 117 for detecting an exhaust gas temperature at a position immediately upstream of the SCR catalyst 47, an $NO_x$ sensor 118 for detecting a concentration of $NO_x$ within the exhaust gas at a position immediately downstream of the SCR catalyst 47, and a PM sensor 119 for detecting PM within the exhaust gas at a position immediately upstream of the slip catalyst 48. The various sensors 109 to 119 provided in the exhaust system EX output detection signals S109 to S119 corresponding to the detected parameters to the PCM 60, respectively.

In this embodiment, the turbocharger 5 is configured as a two-stage turbocharging system capable of efficiently obtaining a high turbocharging performance in all low to high engine speed ranges. The exhaust energy is low within the low engine speed range. That is, the turbocharger 5 includes a large turbocharger 5*a* for turbocharging a large amount of air within a high engine speed range, a small turbocharger 5*b* capable of performing efficient turbocharging even with low exhaust energy, a compressor bypass valve 5*c* for controlling the flow of intake air to a compressor of the small turbocharger 5*b*, a regulator valve 5*d* for controlling the flow of exhaust gas to a turbine of the small turbocharger 5*b*, and a wastegate valve 5*e* for controlling the flow of exhaust gas to a turbine of the large turbocharger 5*a*. By driving each valve in accordance with the operating state of the engine E (engine speed and load), the operated turbocharger is switched between the large turbocharger 5*a* and the small turbocharger 5*b*.

The engine system 200 of this embodiment also includes an EGR device 43. The EGR device 43 includes an EGR passage 43*a* connecting a position of the exhaust passage 41 upstream of the turbine of the turbocharger 5 with a position of the intake passage 1 downstream of the compressor of the turbocharger 5 (more specifically, downstream of the intercooler 8), an EGR cooler 43*b* for cooling the exhaust gas passing through the EGR passage 43*a*, a first EGR valve 43*c* for adjusting a flow rate of the exhaust gas passing through the EGR passage 43*a*, an EGR cooler bypass passage 43*d* for causing the exhaust gas to bypass the EGR cooler 43*b*, and a second EGR valve 43*e* for adjusting a flow rate of the exhaust gas passing through the EGR cooler bypass passage 43*d*.

Figure 2:
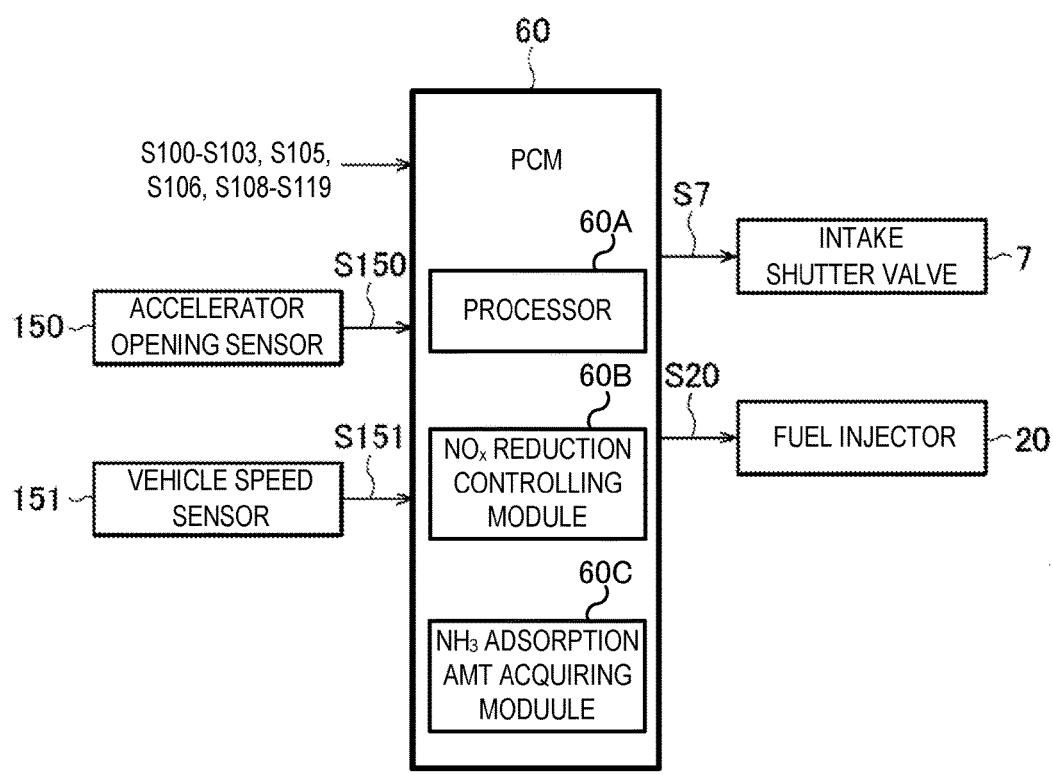
FIG. 2 is a block diagram illustrating an electrical configuration of the exhaust emission control system of the engine of the embodiment.

Next, an electrical configuration of the exhaust emission control system of the engine of the embodiment is described with reference to FIG. 2.

Based on the detection signals S100 to S103, S105, S106, S108 to S119 of the various sensors 100 to 103, 105, 106 and 108 to 119 described above, and detection signals S150 and S151 outputted by an accelerator opening sensor 150 for detecting a position of an accelerator pedal (accelerator opening) and a vehicle speed sensor 151 for detecting a vehicle speed, respectively, the PCM 60 of this embodiment outputs a control signal S20 for mainly controlling the fuel injector 20, and a control signal S7 for controlling the intake shutter valve 7.

Particularly in this embodiment, the PCM 60 executes an $NO_x$ reduction control in which the fuel injector 20 is controlled to perform a post injection to control the air-fuel ratio of the exhaust gas to a target air-fuel ratio (specifically, a given air-fuel ratio approximately equal to or smaller than a theoretical air-fuel ratio), so that the $NO_x$ catalyst 45 is controlled to reduce $NO_x$ stored therein. In other words, the PCM 60 performs the post injection after a main injection. In the main injection, the fuel is injected into the cylinder (in the main injection, typically various settings including a fuel injection amount are executed so as to obtain a lean air-fuel ratio) so as to output an engine torque according to an accelerator operation by a vehicle operator. In the post injection, the fuel is injected at a timing so that the engine torque output is not influenced (e.g., expansion stroke) so as to achieve $\lambda \approx 1$ or $\lambda < 1$ and reduce $NO_x$ stored in the $NO_x$ catalyst 45. Hereinafter, such a control for reducing $NO_x$ stored in the $NO_x$ catalyst 45 is referred to as "DeNO$_x$ control." It will be noted that "De" in the word "DeNO$_x$" means a prefix meaning separation or removal.

Although is described later in detail, the PCM 60 functions as "ammonia adsorption amount acquiring module" and "$NO_x$ reduction controlling module."

It will be noted that the PCM 60 is comprised of a processor 60A (i.e., a CPU (central processing unit)), various programs which are interpreted and executed by the processor 60A (including a basic control program, such as OS, and an application program activated on the OS and realizing a specific function), and an internal memory such as ROM(s) and/or RAM(s), for storing programs and various data. The processor is configured to execute at least a $NO_x$ reduction controlling module 60B for executing an $NO_x$ reduction control in which the air-fuel ratio is controlled to a target air-fuel ratio so that the stored $NO_x$ is reduced, and an ammonium adsorption amount acquiring module 60C for acquiring an ammonia adsorption amount of the SCR catalyst by one of detection and estimation. These modules are stored in the internal memory as one or more software programs.

<Fuel Injection Control>

Figure 3:
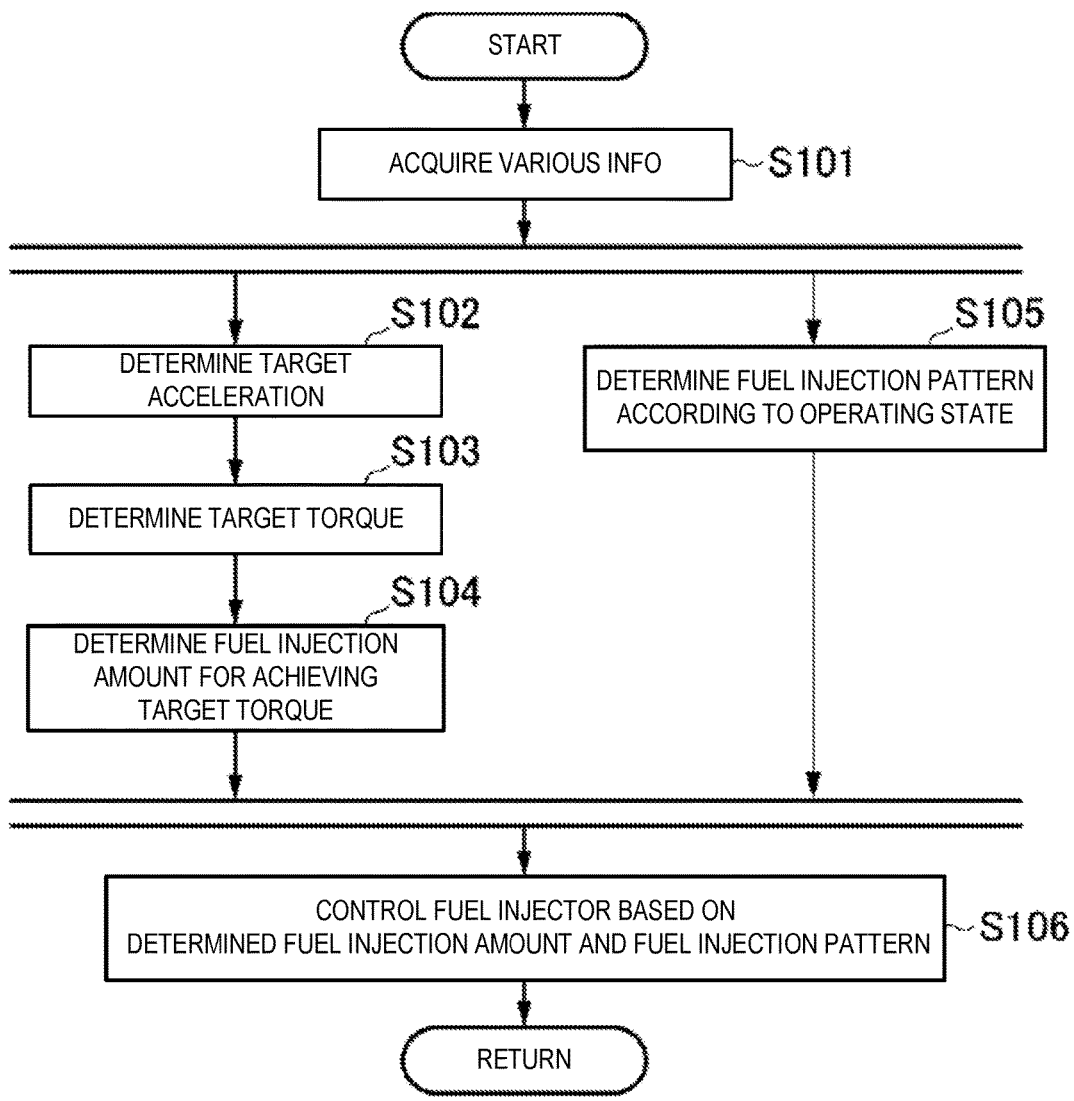
FIG. 3 is a flowchart illustrating a fuel injection control of the embodiment.

Next, a fuel injection control of this embodiment is described with reference to the flowchart (fuel injection control flow) of FIG. 3. This fuel injection control flow is started when an ignition of the vehicle is turned on and the PCM 60 is powered on, and repeatedly executed at a given cycle.

First, at S101, the PCM 60 acquires an operating state of the vehicle. For example, the PCM 60 acquires at least the accelerator opening detected by the accelerator opening sensor 150, the vehicle speed detected by the vehicle speed sensor 151, the crank angle detected by the crank angle sensor 100, and a gear range currently set in a transmission of the vehicle.

Next, at S102, the PCM 60 sets a target acceleration based on the acquired operating state of the vehicle at S101. For example, the PCM 60 selects, from a plurality of acceleration characteristic maps (created in advance and stored in the memory) defined for various vehicle speeds and various gear ranges, an acceleration characteristic map corresponding to the current vehicle speed and gear range, and determines the target acceleration corresponding to the current accelerator opening by referring to the selected acceleration characteristic map.

Next, at S103, the PCM 60 determines a target torque of the engine E to achieve the target acceleration determined at S102. In this case, the PCM 60 determines the target torque within a range of torque which the engine E is able to output, based on the current vehicle speed, the gear range, a current road surface inclination, a road surface μ, etc.

Next, at S104, the PCM 60 calculates the fuel injection amount to be injected from the fuel injector 20 based on the target torque and the engine speed, so as to output the target torque from the engine E determined at S103. This fuel injection amount is applied in the main injection (main injection amount).

On the other hand, in parallel with the processings at S102 to S104, the PCM 60 sets a fuel injection pattern according to the operating state of the engine E at S105. For example, when executing the above $DeNO_x$ control, the PCM 60 sets a fuel injection pattern in which at least the post injection is performed in addition to the main injection. In this case, the PCM 60 also determines the fuel injection amount applied in the post injection (post injection amount) and the timing to perform the post injection (post injection timing etc.), of which details are described later.

Then, the flow proceeds to S106 where the PCM 60 controls the fuel injector 20 based on the main injection amount calculated at S104 and the fuel injection pattern set at S105 (including the post injection amount and the post injection timing in the case where the post injection is performed). In other words, the PCM 60 controls the fuel injector 20 so that a desired amount of fuel is injected in a desired fuel injection pattern.

<$DeNO_x$ Control>

Hereinafter, the $DeNO_x$ control of this embodiment is described in detail.

First, a basic concept of the $DeNO_x$ control of this embodiment is described. In this embodiment, when the amount of stored $NO_x$ in the $NO_x$ catalyst 45 is above a predetermined amount, typically when the amount of stored $NO_x$ is approximately equal to a limit value (e.g., the capacity of the $NO_x$ catalyst 45), the PCM 60 executes a $DeNO_x$ control in which the fuel injector 20 is controlled to perform the post injection so that the air-fuel ratio is continuously controlled to the target air-fuel ratio, in order to reduce $NO_x$ stored in the $NO_x$ catalyst 45 to approximate zero (may suitably be referred to as "active $DeNO_x$ control"). In this manner, a large amount of $NO_x$ stored in the $NO_x$ catalyst 45 is forcibly reduced and the $NO_x$ purification performance of the $NO_x$ catalyst 45 is reliably ensured.

Even when the amount of stored $NO_x$ in the $NO_x$ catalyst 45 is below the predetermined amount, when the air-fuel ratio becomes rich due to acceleration of the vehicle, the PCM 60 executes a $DeNO_x$ control in which the fuel injector 20 is controlled to perform the post injection so as to temporarily control the air-fuel ratio to the target air-fuel ratio, in order to reduce $NO_x$ stored in the $NO_x$ catalyst 45 (may suitably be referred to as "passive $DeNO_x$ control"). In the passive $DeNO_x$ control, the post injection is performed to control the air-fuel ratio to approximately equal to or smaller than the theoretical air-fuel ratio under a situation where the air-fuel ratio decreases due to the increase of the main injection amount, such as during acceleration of the vehicle. Therefore, the post injection amount for controlling the air-fuel ratio to the target air-fuel ratio is smaller compared to when the $DeNO_x$ control is executed in a situation where the air-fuel ratio does not decrease (i.e., no acceleration). Moreover, since the passive $DeNO_x$ control is executed accompanying the acceleration of the vehicle, the frequency of executing this control is relatively high.

In this embodiment, by applying such a passive $DeNO_x$ control, $DeNO_x$ is performed frequently while preventing a fuel consumption increase due to $DeNO_x$. Although the passive $DeNO_x$ control is executed only for a relatively short period of time, since it is executed frequently, the amount of stored $NO_x$ in the $NO_x$ catalyst 45 is efficiently reduced. As a result, the amount of stored $NO_x$ in the $NO_x$ catalyst 45 does not easily exceed the predetermined amount, therefore the execution frequency of the active $DeNO_x$ control, which requires a larger amount of post injection amount than in the passive $DeNO_x$ control, is lowered. Thus, it becomes possible to effectively prevent fuel consumption increases due to $DeNO_x$.

Further in this embodiment, when executing the above active $DeNO_x$ control, the fuel injected in the post injection (hereinafter, referred to as "post-injected fuel") is combusted inside the cylinder of the engine E to control the air-fuel ratio to the target air-fuel ratio. Here, the PCM 60 performs the post injection at a timing so that the post-injected fuel is combusted inside the cylinder. For example, the PCM 60 sets a given timing in an early half of the expansion stroke of the engine E as the post injection timing of the active $DeNO_x$ control. By applying such a post injection timing to the active $DeNO_x$ control, it is possible to prevent discharge of the post-injected fuel as unburned fuel (i.e., HC) or oil dilution due to the post-injected fuel.

On the other hand, in this embodiment, when executing the passive $DeNO_x$ control, the PCM 60 controls the air-fuel ratio to the target air-fuel ratio by discharging the post-injected fuel as unburned fuel into the exhaust passage 41 without combusting it inside the cylinder of the engine E. In this case, the PCM 60 performs the post injection at a timing so that the post-injected fuel is discharged from the cylinder to the exhaust passage 41 as unburned fuel. For example, the PCM 60 sets a given timing in a latter half of the expansion stroke of the engine E as the post injection timing of the passive $DeNO_x$ control. By applying such a post injection timing to the passive $DeNO_x$ control, generation of smoke (soot) due to the post-injected fuel is combusted inside the cylinder is prevented.

Here, operating ranges of the engine E within which the passive $DeNO_x$ control and the active $DeNO_x$ control are executed in this embodiment are described with reference to FIG. 4 in which the horizontal axis shows engine speed and the vertical axis shows engine load. Further in FIG. 4, the curve L1 indicates a highest torque line of the engine E.

Figure 4:
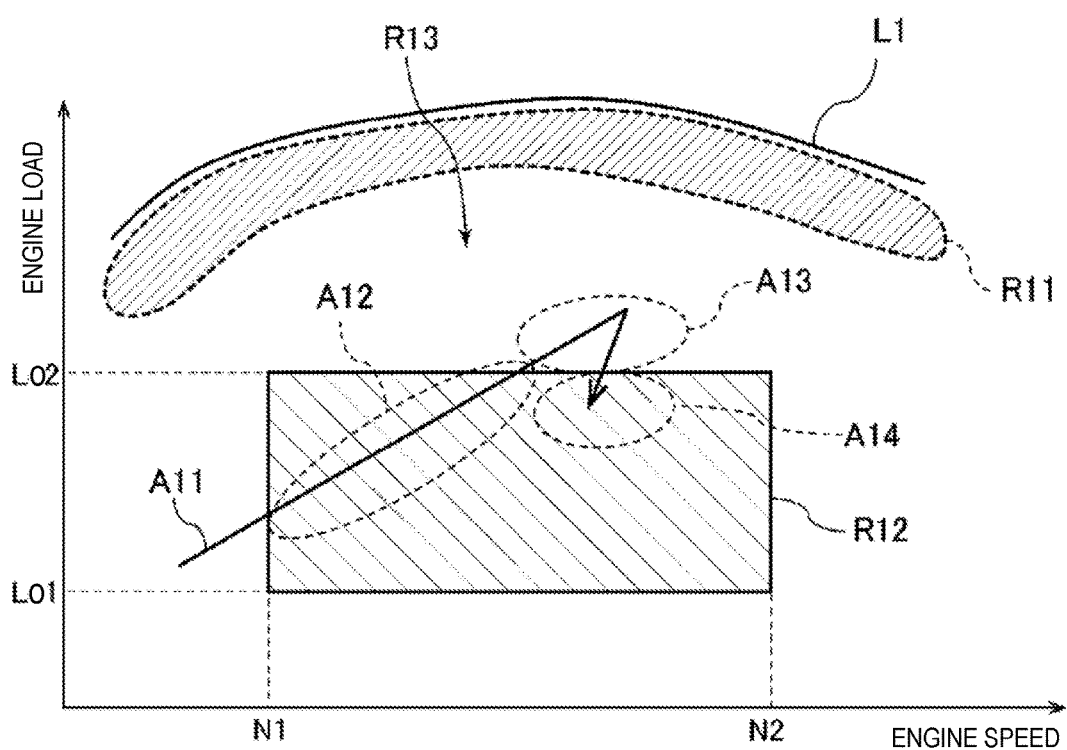
FIG. 4 is a chart illustrating operating ranges of the engine within which a passive $DeNO_x$ control and an active $DeNO_x$ control are executed, respectively, in the embodiment.

As illustrated in FIG. 4, in this embodiment, the PCM 60 executes the active $DeNO_x$ control when the engine load is within a medium load range equal to and higher than a first load Lo1 but lower than a second load Lo2 (>first load Lo1) and the engine speed is within a medium speed range equal to and higher than a first speed N1 but lower than a second speed N2 (>first speed N1), i.e., the engine load and the engine speed are within an operating range indicated by R12

(hereinafter, referred to as "active DeNO$_x$ execution range R12"). The active DeNO$_x$ execution range R12 is adopted because of the following reason.

As described above, when the active DeNO$_x$ control is executed, in view of preventing HC generation caused by the post-injected fuel being discharged as it is, the oil dilution by the post-injected fuel, etc., the post injection is performed at the timing so that the fuel is combusted inside the cylinder. In this case, in this embodiment, when the post-injected fuel is combusted, the generation of smoke and also HC (i.e., discharge of unburned fuel due to incomplete combustion) is prevented. For example, the time for the post-injected fuel to combust is extended as long as possible, i.e., ignition is caused in a state where air and fuel are suitably mixed, so that the generation of smoke and HC is prevented. Therefore, in the active DeNO$_x$ control, a suitable amount of EGR gas is introduced to effectively delay the ignition of the post-injected fuel.

It will be noted that the reason for preventing the HC generation during the active DeNO$_x$ control is to prevent a scenario where, in the case where the EGR gas is introduced as described above, HC also recirculates to the intake system IN as EGR gas and this HC serves as a binder to combine with soot and clog the gas passage. In addition, when the active DeNO$_x$ control is executed within an operating range within which the temperature of the NO$_x$ catalyst 45 is low and HC purification performance (purification performance of HC due to DOC in the NO$_x$ catalyst 45) is not ensured, the HC generation reduction is performed to prevent the HC from being discharged without being purified. The active DeNO$_x$ execution range R12 also includes a range where the temperature of the NO$_x$ catalyst 45 is relatively low and thus cannot ensure such HC purification performance.

The reason for preventing smoke generation in the active DeNO$_x$ control is to prevent a scenario where DPF regeneration for combusting and removing PM corresponding to smoke being captured by the DPF 46 (a control of performing post injection similar to the DeNO$_x$ control) is performed frequently and fuel consumption increases.

Incidentally, when the engine load becomes high, since the air introduced into the engine E is reduced to achieve the target air-fuel ratio, the amount of oxygen required for suitable combustion of the post-injected fuel becomes insufficient and smoke and HC tend to be generated. Especially, as the engine load increases, the in-cylinder temperature rises and the post-injected fuel is ignited without sufficient time from the post injection of the fuel, i.e., combustion occurs before air and fuel are properly mixed, which causes the generation of smoke and HC. On the other hand, within an operating range where the engine load is considerably low, the temperature of the NO$_x$ catalyst 45 is low and the NO$_x$ catalyst 45 does not perform the NO$_x$ reducing function sufficiently. In addition, within this range, the post-injected fuel does not suitably combust, i.e., a misfire occurs.

Although in the above description the phenomenon related to the engine load is described, the same phenomenon occurs with the engine speed.

Thus, in this embodiment, the operating range of the engine E corresponding to the medium load range and the medium speed range is adopted as the active DeNO$_x$ execution range R12 where the active DeNO$_x$ control is executed. In other words, in this embodiment, the active DeNO$_x$ control is executed only within the active DeNO$_x$ execution range R12 and is prohibited outside the active DeNO$_x$ execution range R12. Within the operating range where the active DeNO$_x$ control is prohibited, especially where the engine load or the engine speed is higher than within the active DeNO$_x$ execution range R12 (the range assigned with the reference character "R13"), since the NO$_x$ purification performance of the SCR catalyst 47 is sufficient, the SCR catalyst 47 purifies NOR, and the discharge of NO$_x$ from the vehicle is prevented without executing the DeNO$_x$ control.

Further in this embodiment, within a range where the engine load is higher than the range R13 where the SCR catalyst 47 purifies NO$_x$ (the range assigned with the reference character "R11," hereinafter referred to as "passive DeNO$_x$ execution range R11"), since the amount of exhaust gas increases and the SCR catalyst 47 cannot purify all NO$_x$, the passive DeNO$_x$ control is executed. In this passive DeNO$_x$ control, as described above, the post injection is performed at the timing so that the post-injected fuel is discharged from the cylinder to the exhaust passage 41 as unburned fuel. Within the passive DeNO$_x$ execution range R11, since the temperature of the NO$_x$ catalyst 45 is sufficiently high and suitable purification performance of HC (HC purification performance of the DOC in the NO$_x$ catalyst 45) is ensured, the NO$_x$ catalyst 45 properly purifies the unburned fuel discharged as described above.

It will be noted that, if the post-injected fuel is combusted inside the cylinder in the passive DeNO$_x$ control as in the active DeNO$_x$ control, smoke is generated. The reason for this is similar to the reason for prohibiting execution of the active DeNO$_x$ control when the engine load becomes high. Therefore, in the passive DeNO$_x$ control, the post-injected fuel is discharged from the cylinder to the exhaust passage 41 as unburned fuel.

Here, a specific example of the active DeNO$_x$ control when the operating state of the engine changes as indicated by the arrow A11 in FIG. 4 is described. First, when the operating state of the engine enters the active DeNO$_x$ execution range R12 (see the area indicated by the reference character "A12"), the PCM 60 executes the active DeNO$_x$ control. Then, when the operating state of the engine reaches outside the active DeNO$_x$ execution range R12 (see the area indicated by the reference character "A13"), the PCM 60 suspends the active DeNO$_x$ control, and the SCR catalyst 47 purifies NOR. When the operating state of the engine re-enters the active DeNO$_x$ execution range R12 (see the area indicated by the reference character "A14"), the PCM 60 resumes the active DeNO$_x$ control. In this manner, the active DeNO$_x$ control is carried on until NO$_x$ stored in the NO$_x$ catalyst 45 drops almost down to zero.

Next, the temperature ranges within which the passive DeNO$_x$ control and the active DeNO$_x$ control are executed, respectively, in this embodiment are described. Typically, the NO$_x$ catalyst 45 exerts the NO$_x$ purification performance within a relatively low temperature range, and the SCR catalyst 47 exerts the NO$_x$ purification performance within a relatively high temperature range, e.g., higher than the range where the NO$_x$ catalyst 45 exerts the NO$_x$ purification performance. In this embodiment, a temperature in close proximity to a lowest value within the temperature range, where the NO$_x$ purification rate higher than a given value is attainable by the SCR catalyst 47, is used as the determination temperature (hereinafter, referred to as "SCR determination temperature"). The passive DeNO$_x$ control or the active DeNO$_x$ control is executed only when the temperature of the SCR catalyst 47 (hereinafter, referred to as "SCR temperature") is below the SCR determination temperature. If the SCR temperature is above the SCR determination temperature, executions of the passive DeNO$_x$ control and the active DeNO$_x$ control are prohibited. The reason for the prohibition is that since the SCR catalyst 47 suitably purifies NO$_x$ within the exhaust gas when the SCR temperature is above the SCR determination temperature, the $DeNO_x$ control is not particularly needed to ensure the $NO_x$ purification performance of the $NO_x$ catalyst 45. Therefore, in this embodiment, when the SCR temperature is above the SCR determination temperature, execution of the $DeNO_x$ control is prohibited to prevent a fuel consumption increase.

Figure 5:
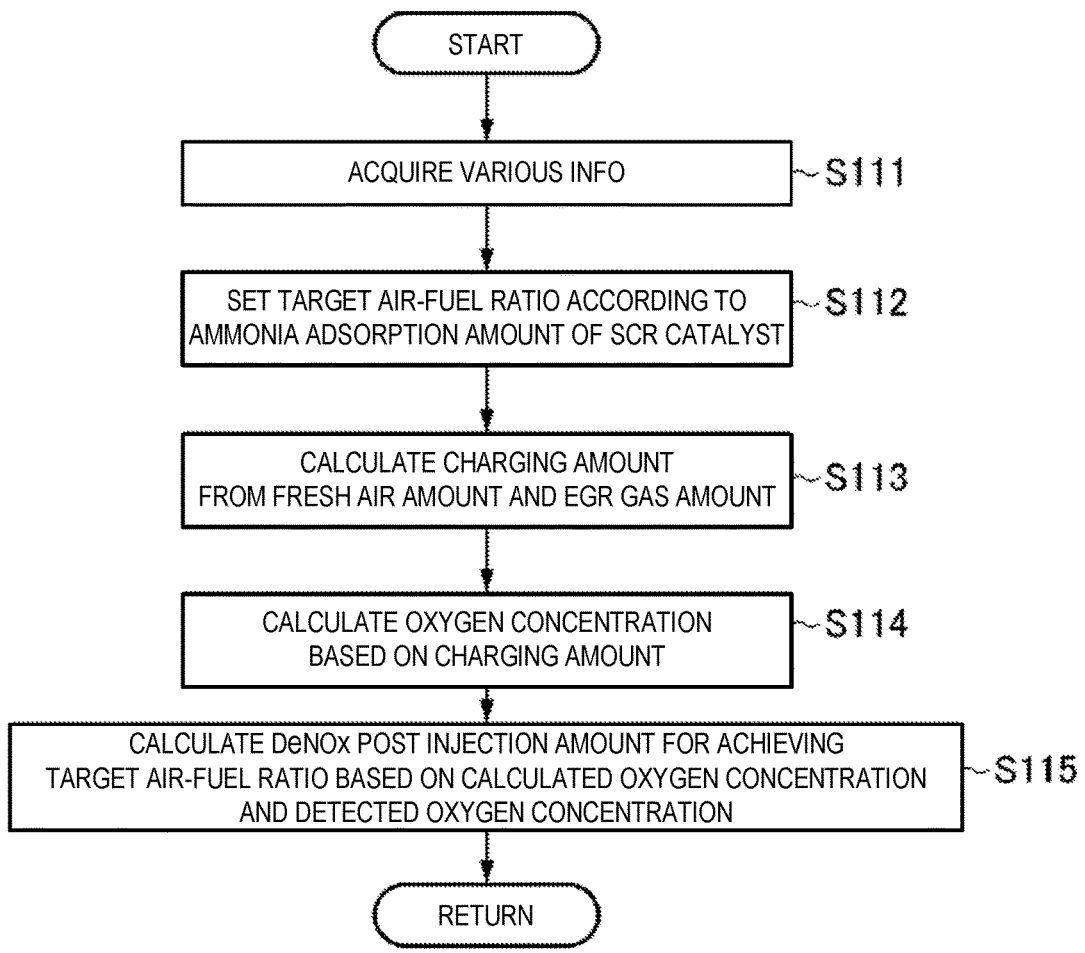
FIG. 5 is a flowchart illustrating a $DeNO_x$ post injection amount calculation of the embodiment.

Next, a method of calculating the post injection amount applied in the $DeNO_x$ control (hereinafter, referred to as "$DeNO_x$ post injection amount") in this embodiment is described with reference to the flowchart (hereinafter, referred to as "$DeNO_x$ post injection amount calculation flow") of FIG. 5. The PCM 60 repeatedly executes the $DeNO_x$ post injection amount calculation flow at a given cycle in parallel with the fuel injection control flow illustrated in FIG. 3. In other words, the $DeNO_x$ post injection amount is calculated as needed during the fuel injection control.

First, at S111, the PCM 60 acquires the operating state of the engine E. For example, the PCM 60 at least acquires the intake air amount (fresh air amount) detected by the airflow sensor 101, the oxygen concentration within the exhaust gas detected by the O2 sensor 111, and the main injection amount calculated at S104 of FIG. 3. The PCM 60 also acquires an exhaust gas amount (EGR gas amount) recirculated to the intake system IN by the EGR device 43, which is obtained based on a given model, and also an ammonia adsorption amount which is an amount of ammonia adsorbed by the SCR catalyst 47. Here, the PCM 60 acquires an estimated ammonia adsorption amount. The method of estimating the ammonia adsorbed amount is described later in detail (see FIG. 11).

Next, at S112, the PCM 60 sets a target air-fuel ratio applied for reducing $NO_x$ stored in the $NO_x$ catalyst 45 based on the ammonia adsorption amount in the SCR catalyst 47 acquired at S111. For example, the PCM 60 sets a target air-fuel ratio applied when executing the active $DeNO_x$ control and a target air-fuel ratio applied when executing the passive $DeNO_x$ control, based on the ammonia adsorption amount in the SCR catalyst 47. A method of setting the target air-fuel ratios is described in detail with reference to FIG. 6.

Figure 6:
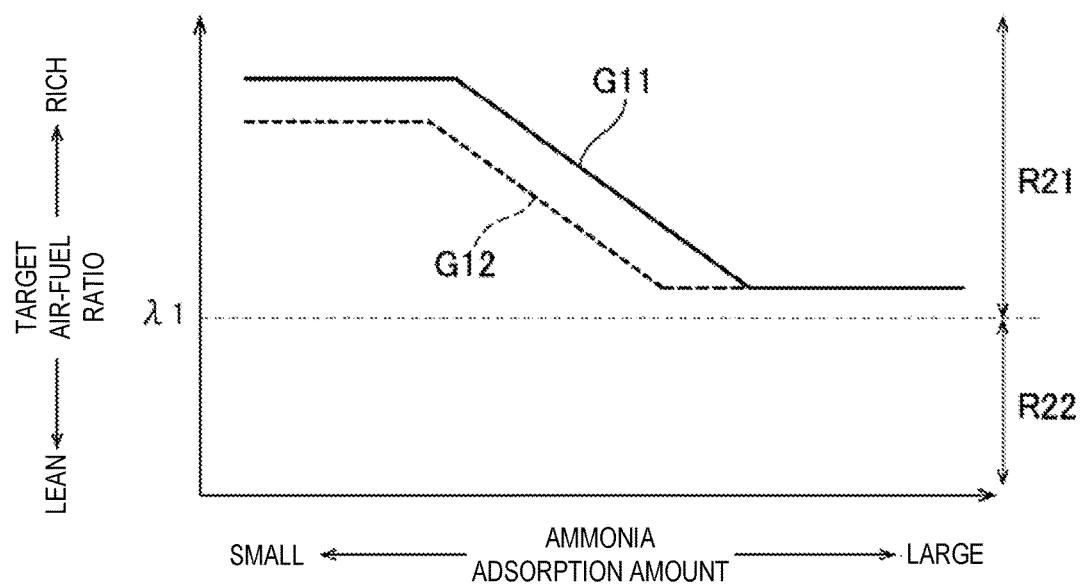
FIG. 6 is a chart illustrating a setting method of a target air-fuel ratio of the embodiment.

In FIG. 6, the horizontal axis indicates the ammonia adsorption amount in the SCR catalyst 47, and the vertical axis indicates the target air-fuel ratio.

In FIG. 6, "$\lambda 1$" indicates the theoretical air-fuel ratio, a range R21 on the richer side of the theoretical air-fuel ratio $\lambda 1$ indicates the air-fuel ratio range where the $NO_x$ stored in the $NO_x$ catalyst 45 is reducible, and a range R22 on the leaner side of the theoretical air-fuel ratio $\lambda 1$ indicates the air-fuel ratio range where the $NO_x$ stored in the $NO_x$ catalyst 45 is not reducible. A graph G11 indicates the target air-fuel ratio to be set according to the ammonia adsorption amount of the SCR catalyst 47 when executing the passive $DeNO_x$ control, and a graph G12 indicates the target air-fuel ratio to be set according to the ammonia adsorption amount of the SCR catalyst 47 when executing the active $DeNO_x$ control. These graphs G11 and G12 correspond to a map defining the target air-fuel ratio to be set according to the ammonia adsorption amount.

Typically, if the target air-fuel ratio is set at the lean side within the range R21, the amount of the reducing agent (e.g., HC) supplied to the $NO_x$ catalyst 45 is reduced, and although the $NO_x$ reduction efficiency of the $NO_x$ catalyst 45 (corresponding to the reduction speed of $NO_x$ stored in the $NO_x$ catalyst 45) decreases, the generation amount of ammonia in the $NO_x$ catalyst 45 is reduced. In consideration of this, in this embodiment, as illustrated in the graphs G11 and G12, in both cases of executing the passive and active $DeNO_x$ controls, the target air-fuel ratio is set leaner within a range where $NO_x$ stored in the $NO_x$ catalyst 45 is reducible (range R21), as the ammonia adsorption amount of the SCR catalyst 47 increases. For example, the target air-fuel ratio is set to about 0.98. By applying such a lean target air-fuel ratio to the $DeNO_x$ control when the ammonia adsorption amount of the SCR catalyst 47 is large, ammonia generated in the $NO_x$ catalyst 45 by the $NO_x$ reduction is prevented from being released without being sufficiently adsorbed by the SCR catalyst 47, while ensuring some level of $NO_x$ reduction efficiency of the $NO_x$ catalyst 45.

On the other hand, if the target air-fuel ratio is set rich, the amount of the reducing agent (e.g., HC) supplied to the $NO_x$ catalyst 45 increases, and although the generation amount of ammonia in the $NO_x$ catalyst 45 increases, the $NO_x$ reduction efficiency of the $NO_x$ catalyst 45 improves. Therefore, in this embodiment, as illustrated in the graphs G11 and G12, in both cases of executing the passive and active $DeNO_x$ controls, the target air-fuel ratio is enriched as the ammonia adsorption amount of the SCR catalyst 47 is reduced. For example, the target air-fuel ratio is set to about 0.96. When the ammonia adsorption amount of the SCR catalyst 47 is small, since it takes time for ammonia generated in the $NO_x$ catalyst 45 to be released without being sufficiently adsorbed by the SCR catalyst 47, by applying the rich air-fuel ratio to the $DeNO_x$ control, the improvement of the $NO_x$ reduction efficiency of the $NO_x$ catalyst 45 is prioritized over the prevention of the ammonia generation in the $NO_x$ catalyst 45.

Further, in this embodiment, as illustrated in the graphs G11 and G12, the target air-fuel ratio is set richer in the passive $DeNO_x$ control than in the active $DeNO_x$ control when the ammonia adsorption amount is the same, for the following reason. Since the passive $DeNO_x$ control is executed at the time of acceleration when the air-fuel ratio temporarily drops, the execution duration is shorter than that of the active $DeNO_x$ control, thus the amount of ammonia (accumulation amount) generated in the $NO_x$ catalyst 45 is reduced. Therefore, the possibility of ammonia being released without being sufficiently adsorbed by the SCR catalyst 47 is low. On the other hand, at the start of the $DeNO_x$ control, "H" in "HC" such as unburned fuel supplied to the $NO_x$ catalyst 45 as the reducing agent by the $DeNO_x$ control is consumed for the reaction with "O" which is oxygen stored in the $NO_x$ catalyst 45 (i.e., oxidation), and no ammonia is generated in the $NO_x$ catalyst 45. The passive $DeNO_x$ control with the shorter execution duration ends before oxygen stored in the $NO_x$ catalyst 45 is completely consumed. Either the ammonia is mostly not generated in the $NO_x$ catalyst 45, or most of the execution time period of the passive $DeNO_x$ control is included within the time period when oxygen stored in the $NO_x$ catalyst 45 is consumed. Thus, the amount of ammonia generated in the $NO_x$ catalyst 45 is reduced.

In this manner, when executing the passive $DeNO_x$ control, the improvement of the $NO_x$ reduction efficiency of the $NO_x$ catalyst 45 is prioritized over the prevention of ammonia generation in the $NO_x$ catalyst 45.

It will be noted that a highest value of the rich target air-fuel ratio applied in the passive $DeNO_x$ control is preferably set so that the generation amount of HC corresponding to the post-injected fuel becomes smaller than a predetermined amount, so as to prevent the gas passage from being blocked by HC in the $DeNO_x$ control.

Further, in this embodiment, as illustrated in the graphs G11 and G12, in both cases of executing the passive and active $DeNO_x$ controls, the target air-fuel ratio applied when the ammonia adsorption amount is relatively large is substantially fixed. For example, the target air-fuel ratio is set to a lowest value on the lean side whenever the ammonia adsorption amount is relatively large, for the following reason. The ammonia adsorption performance of the SCR catalyst 47 varies depending on the operating state of the engine E, the SCR temperature etc. For example, when the SCR temperature rises, the ammonia adsorption performance of the SCR catalyst 47 degrades, and the adsorbable amount of ammonia in the SCR catalyst 47 tends to be reduced. Therefore, in this embodiment, even in the situation where the ammonia adsorption performance degrades, in order to reliably prevent a scenario where ammonia generated in the $NO_x$ catalyst 45 by the $DeNO_x$ control is not sufficiently adsorbed by the SCR catalyst 47 and is released, the target air-fuel ratio is set with some margin to the lowest value on the lean side for a relatively wide range of the ammonia adsorption amount.

It will be noted that, by taking into consideration the change in the ammonia adsorption performance of the SCR catalyst 47 depending on the SCR temperature as described above, the target air-fuel ratio to be set according to the ammonia adsorption amount may further be changed based on the SCR temperature. For example, the target air-fuel ratio is preferably set leaner within the range R21 when the SCR temperature is high than when the SCR temperature is low, when the ammonia adsorption amount is the same. This is because when the SCR temperature becomes high, the ammonia adsorption performance of the SCR catalyst 47 degrades, and it becomes easy for ammonia to be released from the SCR catalyst 47.

Returning to FIG. 5, the flow after S113 is described. At S113, the PCM 60 calculates the air amount (that is, the charged amount) introduced into the engine E based on the fresh air amount and the EGR gas amount acquired at S111. At S114, the PCM 60 calculates the oxygen concentration within the air introduced into the engine E based on the charged amount calculated at S113.

Next, at S115, the PCM 60 calculates the post injection amount ($DeNO_x$ post injection amount) required in achieving the target air-fuel ratio set at S112. In other words, the PCM 60 determines the post injection amount required in addition to the main injection amount in order to bring the air-fuel ratio of the exhaust gas to the target air-fuel ratio. In this case, the PCM 60 calculates the post injection amount for achieving the target air-fuel ratio when executing the active $DeNO_x$ control set at S112 and the post injection amount for achieving the target air-fuel ratio when executing the passive $DeNO_x$ control set at S112.

For example, the PCM 60 calculates the $DeNO_x$ post injection amount in consideration of the difference between the oxygen concentration (the oxygen concentration detected by the O2 sensor 111) acquired at S111 and the oxygen concentration calculated at S114. More specifically, based on the air-fuel ratio of the exhaust gas generated when the fuel injected in the main injection is combusted, the PCM 60 suitably performs feedback processing according to the difference between the detected oxygen concentration and the calculated oxygen concentration, and calculates the $DeNO_x$ post injection amount for controlling the air-fuel ratio to the target air-fuel ratio. By calculating the $DeNO_x$ post injection amount as described above, the air-fuel ratio is accurately controlled to the target air-fuel ratio by the post injection in the $DeNO_x$ control, and the $NO_x$ stored in the $NO_x$ catalyst 45 is reliably reduced.

Hereinafter, the active $DeNO_x$ control and the passive $DeNO_x$ control of this embodiment are described in detail.

Figure 7:
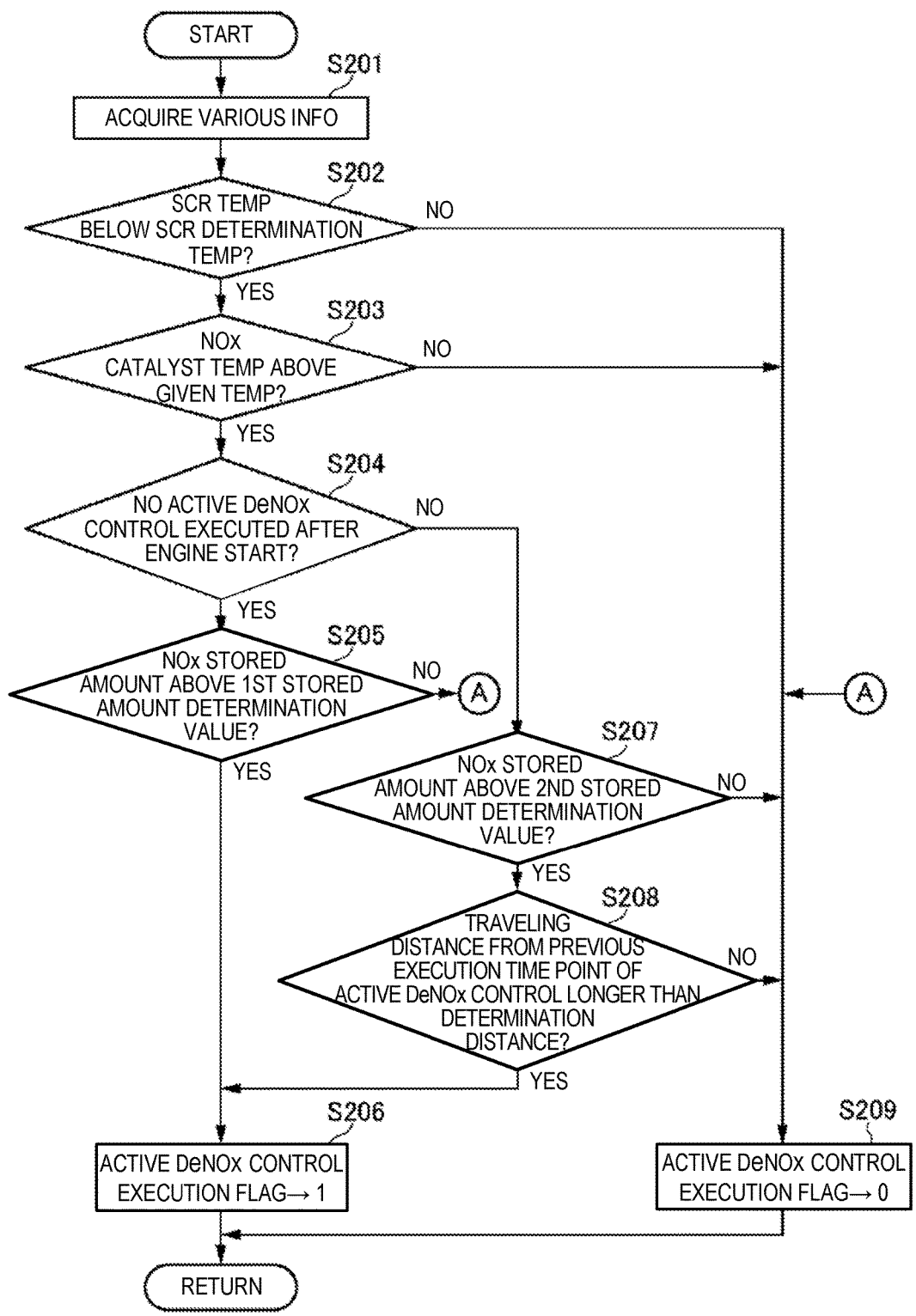
FIG. 7 is a flowchart illustrating setting of an active $DeNO_x$ control execution flag of the embodiment.

First, setting of an active $DeNO_x$ control execution flag, which is for determining whether or not to execute the active $DeNO_x$ control in this embodiment, is described with reference to the flowchart (active $DeNO_x$ control execution flag setting flow) of FIG. 7. The PCM 60 repeatedly executes this active $DeNO_x$ control execution flag setting flow at a given cycle in parallel with the fuel injection control flow illustrated in FIG. 3.

First, at S201, the PCM 60 acquires various information of the vehicle. For example, the PCM 60 acquires at least an $NO_x$ catalyst temperature, the SCR temperature, and the amount of stored $NO_x$ in the $NO_x$ catalyst 45. Here, the $NO_x$ catalyst temperature is estimated, for example, based on the temperature detected by the temperature sensor 112 disposed immediately upstream of the $NO_x$ catalyst 45 (the temperature detected by the temperature sensor 113 disposed between the $NO_x$ catalyst 45 and the DPF 46 may also be used). The SCR temperature is estimated based on, for example, the temperature detected by the temperature sensor 117 disposed immediately upstream of the SCR catalyst 47. The amount of stored $NO_x$ is obtained by estimating the amounts of $NO_x$ within the exhaust gas based on the operating state of the engine E, the flow rate of the exhaust gas, the temperature of the exhaust gas, etc., and integrating the $NO_x$ amounts.

Next, at S202, the PCM 60 determines whether or not the SCR temperature acquired at S201 is below an SCR determination temperature. If the SCR temperature is below the SCR determination temperature (S202: YES), the flow proceeds to S203. On the other hand, if the SCR temperature is above the SCR determination temperature (S202: NO), the flow proceeds to S209. In this case, since the SCR catalyst 47 suitably purifies $NO_x$ within the exhaust gas, the PCM 60 sets the active $DeNO_x$ control execution flag to "0" to prohibit the execution of the active $DeNO_x$ control (S209). Then, the flow ends.

At S203, the PCM 60 determines whether or not the $NO_x$ catalyst temperature acquired at S201 is above a given temperature. When the $NO_x$ catalyst temperature is low, even when the air-fuel ratio is controlled to the target air-fuel ratio, the $NO_x$ catalyst 45 hardly reduces the stored NOR. Therefore, at S203, whether or not the $NO_x$ stored in the $NO_x$ catalyst 45 is reducible is determined. The given temperature used in the determination of S203 is set based on the $NO_x$ catalyst temperature at which the $NO_x$ stored in the $NO_x$ catalyst 45 is reducible. If the $NO_x$ catalyst temperature is above the given temperature (S203: YES), the flow proceeds to S204. On the other hand, when the $NO_x$ catalyst temperature is below the given temperature (S203: NO), the flow proceeds to S209. In this case, the PCM 60 sets the active $DeNO_x$ control execution flag to "0" to prohibit execution of the active $DeNO_x$ control (S209).

At S204, the PCM 60 determines whether or not the active $DeNO_x$ control has been executed even once after an engine start. The determination of S204 is performed so that if the active $DeNO_x$ control has not been executed after the engine start, the execution condition of the active $DeNO_x$ control is loosened than in the case where the active $DeNO_x$ control has been executed, so as to preferentially execute the active $DeNO_x$ control. For example, if the active $DeNO_x$ control has been executed, the execution condition of S207 and the execution condition of S208, which are relatively strict, are used, whereas if the active $DeNO_x$ control has not been executed, only the execution condition of S205 which is relatively loose is used (these are described later in detail). If the active $DeNO_x$ control has not been executed (S204: YES), the flow proceeds to S205.

At S205, the PCM 60 determines whether or not the amount of stored $NO_x$ acquired at S201 is above a first stored amount determination value. For example, the first stored amount determination value is set to a value somewhat lower than the limit value of the amount of stored NOR. If the amount of stored $NO_x$ is above the first stored amount determination value (S205: YES), the flow proceeds to S206. In this case, the PCM 60 sets the active $DeNO_x$ control execution flag to "1" to permit execution of the active $DeNO_x$ control (S206). In this manner, by executing the active $DeNO_x$ control after the engine start to somewhat forcibly reduce the NOR stored in the $NO_x$ catalyst 45, the $NO_x$ purification performance of the $NO_x$ catalyst 45 is reliably ensured. On the other hand, when the amount of stored $NO_x$ is smaller than the first stored amount determination value (S205: NO), the flow proceeds to S209. In this case, the PCM 60 sets the active $DeNO_x$ control execution flag to "0" to prohibit unnecessary execution of the active $DeNO_x$ control (S209). Then, the flow ends.

On the other hand, if the active $DeNO_x$ control has been executed after the engine start (S204: NO), the flow proceeds to S207 where the PCM 60 determines whether or not the amount of stored $NO_x$ acquired at S201 is above a second stored amount determination value. The second stored amount determination value is applied as a value at least higher than the first stored amount determination value, for example, the second stored amount determination value is set to a value close to (such as two-third of) the limit value of the amount of stored NOR. If the amount of stored $NO_x$ is above the second stored amount determination value (S207: YES), the flow proceeds to S208. On the other hand, if the amount of stored $NO_x$ is smaller than the second stored amount determination value (S207: NO), the flow proceeds to S209. In this case, the PCM 60 sets the active $DeNO_x$ control execution flag to "0" to prohibit unnecessary execution of the active $DeNO_x$ control (S209). Then, the flow ends.

At S208, the PCM 60 determines whether or not a traveling distance of the vehicle from the previous execution time point of the active $DeNO_x$ control is longer than a predetermined distance. If this traveling distance is longer than the determination distance (S208: YES), the flow proceeds to S206. In this case, the PCM 60 sets the active $DeNO_x$ control execution flag to "1" to permit execution of the active $DeNO_x$ control (S206). By doing so, the active $DeNO_x$ control is executed to forcibly reduce a large amount of $NO_x$ stored in the $NO_x$ catalyst 45, thus the $NO_x$ purification performance of the $NO_x$ catalyst 45 is reliably ensured. On the other hand, if the traveling distance is less than the determination distance (S208: NO), the flow proceeds to S209. In this case, the PCM 60 sets the active $DeNO_x$ control execution flag to "0" to prohibit execution of the active $DeNO_x$ control (S209). Then, the flow ends.

When the active $DeNO_x$ control is executed in a situation where the traveling distance from the previous execution time point of the active $DeNO_x$ control is short (i.e., the execution interval of the active $DeNO_x$ control is short), the possibility of the oil dilution due to the post injection occurring becomes high. Therefore, in this embodiment, when this traveling distance is shorter than the determination distance (S208: NO), execution of the active $DeNO_x$ control is prohibited and the oil dilution due to the post injection in the active $DeNO_x$ control is prevented. On the other hand, if the traveling distance from the previous execution time point of the active $DeNO_x$ control is long (i.e. the execution interval of the active $DeNO_x$ control is long), even when the active $DeNO_x$ control is to be executed, the possibility of the oil dilution occurring due to the post injection is low. Therefore, in this embodiment, when the traveling distance from the previous execution time point of the active $DeNO_x$ control is longer than the determination distance (S208: YES), execution of the active $DeNO_x$ control is permitted.

Further in this embodiment, in consideration of the fact that progression in vaporization of post-injected fuel and oil dilution are less likely to occur as the in-cylinder temperature rises, the determination distance used at S208 is set small as the in-cylinder temperature rises to loosen the limitation on the control corresponding to the traveling distance from the previous execution time point of the active $DeNO_x$ control.

Figure 8:
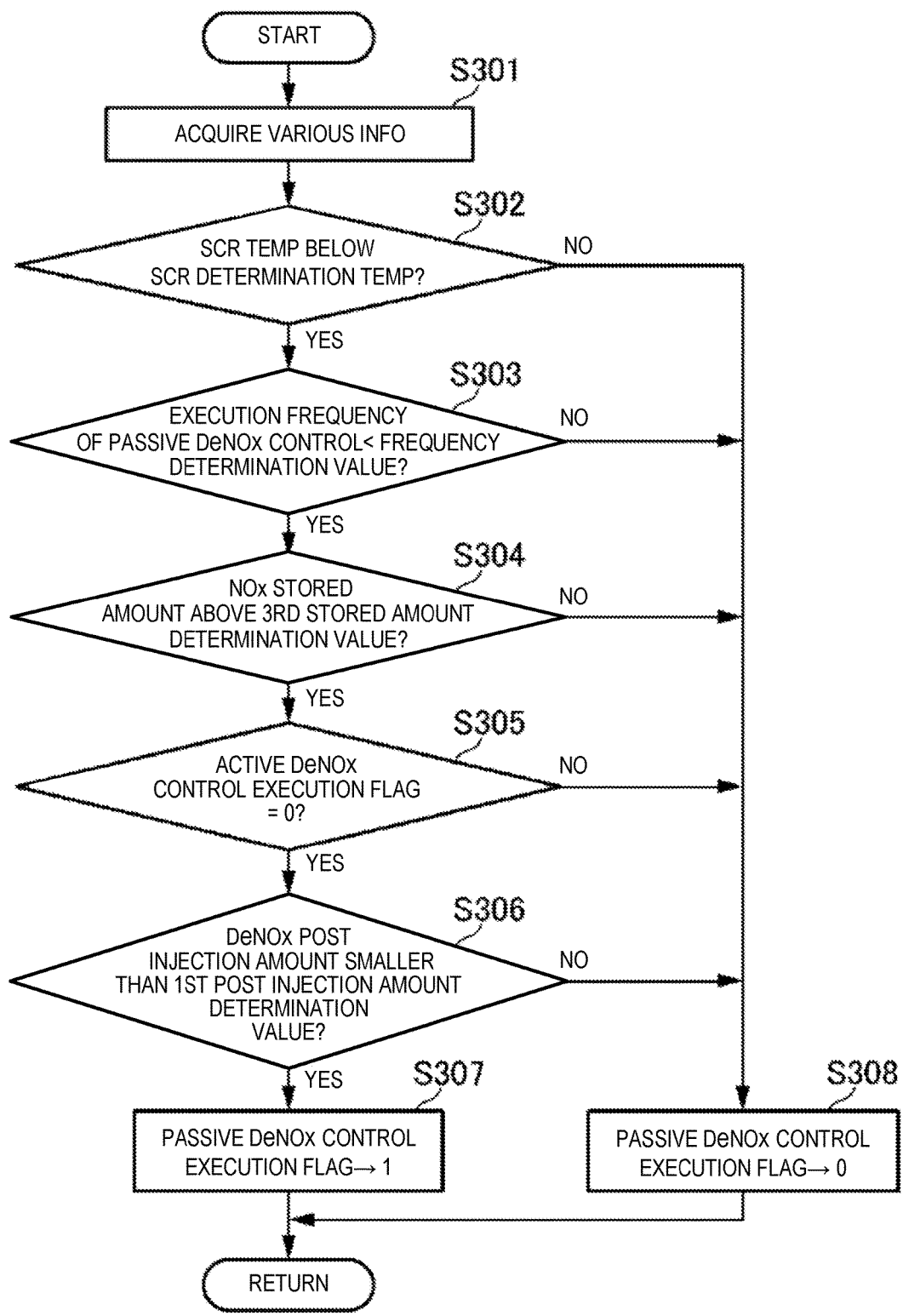
FIG. 8 is a flowchart illustrating setting of a passive $DeNO_x$ control execution flag of the embodiment.

Next, setting of a passive $DeNO_x$ control execution flag, which is for determining whether or not to execute the passive $DeNO_x$ control in this embodiment, is described with reference to the flowchart (passive $DeNO_x$ control execution flag setting flow) of FIG. 8. The PCM 60 repeatedly executes this passive $DeNO_x$ control execution flag setting flow at a given cycle in parallel with the fuel injection control flow illustrated in FIG. 3 and the active $DeNO_x$ control execution flag setting flow illustrated in FIG. 7.

First, at S301, the PCM 60 acquires various information of the vehicle. For example, the PCM 60 acquires at least the $NO_x$ catalyst temperature, the SCR temperature, the target torque determined in the fuel injection control flow illustrated in FIG. 3, the $DeNO_x$ post injection amount calculated in the $DeNO_x$ post injection amount calculation flow illustrated in FIG. 5 (specifically, the $DeNO_x$ post injection amount calculated to be applied in the passive $DeNO_x$ control), the amount of stored $NO_x$ in the $NO_x$ catalyst 45, and the value of the active $DeNO_x$ control execution flag set in the active $DeNO_x$ control execution flag setting flow illustrated in FIG. 7. It will be noted that the method of obtaining the $NO_x$ catalyst temperature, the SCR temperature, and the amount of stored $NO_x$ is as described above.

At S301, the PCM 60 also acquires the execution frequency of the passive $DeNO_x$ control within a given period. For example, the PCM 60 acquires the number of times the passive $DeNO_x$ control is executed within a given period (e.g., several seconds or several minutes) as the execution frequency of the passive $DeNO_x$ control.

Next, at S302, the PCM 60 determines whether or not the SCR temperature acquired at S301 is below the SCR determination temperature. If the SCR temperature is below the SCR determination temperature (S302: YES), the flow proceeds to S303. On the other hand, if the SCR temperature is above the SCR determination temperature (S302: NO), the flow proceeds to S308. In this case, since the SCR catalyst 47 suitably purifies $NO_x$ within the exhaust gas, the PCM 60 sets the passive $DeNO_x$ control execution flag to "0" to prohibit execution of the passive $DeNO_x$ control (S308). Then, the flow ends.

Next, at S303, the PCM 60 determines whether or not the execution frequency of the passive $DeNO_x$ control acquired at S301 is below a given frequency determination value. If the execution frequency is below the frequency determination value (S303: YES), the flow proceeds to S304. On the other hand, if the execution frequency is above the frequency determination value (S303: NO), the flow proceeds to S308. In this case, the PCM 60 sets the passive $DeNO_x$ control execution flag to "0" to prohibit execution of the passive $DeNO_x$ control (S308).

If the passive $DeNO_x$ control is executed in a situation where the passive $DeNO_x$ control has been carried out relatively frequently, there is a high possibility that oil dilution occurs due to the post injection. Therefore, in this embodiment, when the execution frequency of the passive DeNO$_x$ control is above the frequency determination value (S303: NO), execution of the passive DeNO$_x$ control is prohibited so as to prevent oil dilution due to the post injection of the passive DeNO$_x$ control. On the other hand, in a situation where the passive DeNO$_x$ control has hardly been carried out (i.e., the execution frequency of the passive DeNO$_x$ control is relatively low), even when the passive DeNO$_x$ control is executed, the possibility of oil dilution occurring due to the post injection is low. Therefore, in this embodiment, when the execution frequency of the passive DeNO$_x$ control is below the frequency determination value (S303: YES), execution of the passive DeNO$_x$ control is allowed.

In this embodiment, the frequency determination value used at S303 is set higher as the in-cylinder temperature rises. When the frequency determination value is high, there is a higher possibility that the execution frequency of the passive DeNO$_x$ control becomes less than the frequency determination value (S303: YES) than when the frequency determination value is low. Therefore, in this embodiment, the limitation on the control corresponding to the execution frequency of the passive DeNO$_x$ control is loosened as the in-cylinder temperature rises. This is because vaporization of the post-injected fuel progresses and oil dilution becomes less likely to occur as the in-cylinder temperature rises.

Next, at S304, whether or not the amount of stored NO$_x$ acquired at S301 is above a third stored amount determination value. For example, the third stored amount determination value is set to a value of about one-third of the limit value of the amount of stored NOR. If the amount of stored NO$_x$ is above the third stored amount determination value (S304: YES), the flow proceeds to S305. On the other hand, if the amount of stored NO$_x$ is below the third stored amount determination value (S304: NO), the flow proceeds to S308. In this case, the PCM 60 sets the passive DeNO$_x$ control execution flag to "0" (S308) so as to prohibit unnecessary execution of the passive DeNO$_x$ control and prevent the fuel consumption increase caused by the passive DeNO$_x$ control. Then, the flow ends.

At S305, the PCM 60 determines whether or not the active DeNO$_x$ control execution flag acquired at S301 is "0." In other words, the PCM 60 determines whether or not to execute the active DeNO$_x$ control. If the active DeNO$_x$ control execution flag is "0" (S305: YES), the flow proceeds to S306. On the other hand, if the active DeNO$_x$ control execution flag is not "0," i.e., if it is "1" (S305: NO), the flow proceeds to S308. In this case, the PCM 60 sets the passive DeNO$_x$ control execution flag to "0" to prohibit execution of the passive DeNO$_x$ control and preferentially executes the active DeNO$_x$ control (S308). In other words, even when the execution condition of the passive DeNO$_x$ control is satisfied, when the execution condition of the active DeNO$_x$ control is satisfied, the active DeNO$_x$ control is preferentially executed. Then, the flow ends.

At S306, the PCM 60 determines whether or not the DeNO$_x$ post injection amount acquired at S301 is smaller than a first post injection amount determination value. In other words, the PCM 60 determines whether or not the air-fuel ratio drops to a given value on the rich side in the current situation, i.e., whether or not the vehicle is in a given acceleration state. In this manner, it is determined whether or not the DeNO$_x$ control is executable while preventing the fuel consumption increase as much as possible, and it is determined whether or not there is a possibility of oil dilution occurring due to the post injection. The first post injection amount determination value to be applied for the determination at S306 is set in view of the above.

If the DeNO$_x$ post injection amount is smaller than the first post injection amount determination value (S306: YES), the flow proceeds to S307. In this case, the conditions of S302 to S306 described above are all satisfied, the PCM 60 sets the passive DeNO$_x$ control execution flag to "1" to permit execution of the passive DeNO$_x$ control (S307). Then, the flow ends. On the other hand, if the DeNO$_x$ post injection amount is above the first post injection amount determination value (S306: NO), the flow proceeds to S308. In this case, the PCM 60 sets the passive DeNO$_x$ control execution flag to "0" to prohibit execution of the passive DeNO$_x$ control and prevent the fuel consumption increase and the oil dilution (S308). Then, the flow ends.

Figure 9:
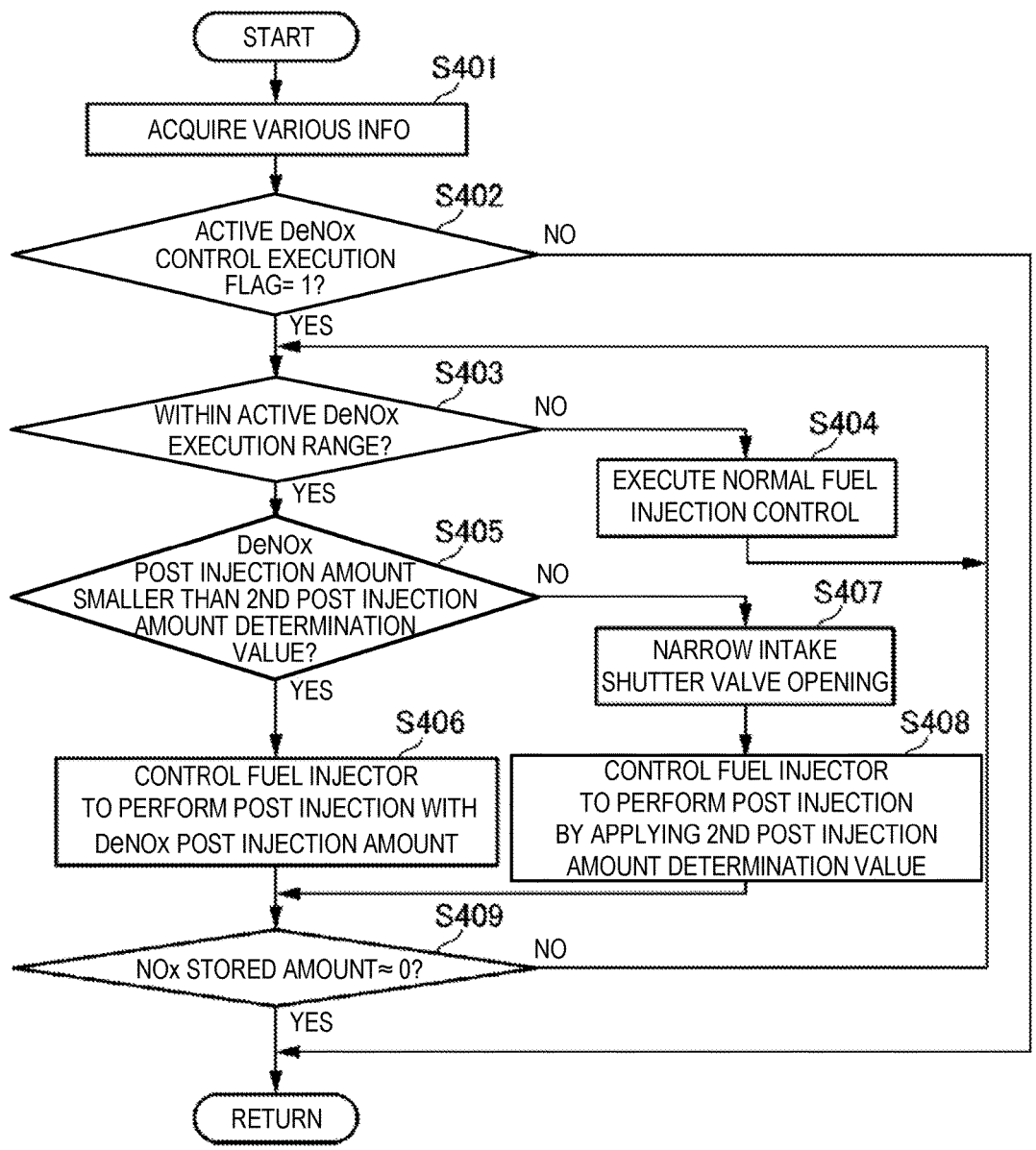
FIG. 9 is a flowchart illustrating the active $DeNO_x$ control of the embodiment.

Next, the active DeNO$_x$ control of this embodiment executed based on the active DeNO$_x$ control execution flag set as described above is described with reference to the flowchart (active DeNO$_x$ control flow) of FIG. 9. The PCM 60 repeatedly executes this active DeNO$_x$ control flow at a given cycle in parallel with the fuel injection control flow illustrated in FIG. 3, and the active DeNO$_x$ control execution flag setting flow illustrated in FIG. 7, etc.

First, at S401, the PCM 60 acquires various information of the vehicle. For example, the PCM 60 at least acquires the engine load, the engine speed, the NO$_x$ catalyst temperature, the DeNO$_x$ post-injection amount calculated in the DeNO$_x$ post injection amount calculation flow illustrated in FIG. 5 (specifically, the DeNO$_x$ post injection amount calculated to be applied in the active DeNO$_x$ control), and the value of the active DeNO$_x$ control execution flag set in the active DeNO$_x$ control execution flag setting flow illustrated in FIG. 7.

Next, at S402, the PCM 60 determines whether the active DeNO$_x$ control execution flag acquired at S401 is "1." In other words, the PCM 60 determines whether the active DeNO$_x$ control is to be executed. If the active DeNO$_x$ control execution flag is "1" (S402: YES), the flow proceeds to S403. On the other hand, if the active DeNO$_x$ control execution flag is "0" (S402: NO), the flow is terminated without executing the active DeNO$_x$ control.

At S403, the PCM 60 determines whether or not the operating state of the engine (engine load and engine speed) is within the active DeNO$_x$ execution range R12 (see FIG. 4). If the operating state of the engine is within the active DeNO$_x$ execution range R12 (S403: YES), the flow proceeds to S405. On the other hand, if the operating state of the engine is outside the active DeNO$_x$ execution range R12 (S403: NO), the flow proceeds to S404.

At S404, without executing the active DeNO$_x$ control, i.e., without executing the fuel injection control which includes the post injection, the PCM 60 executes a normal fuel injection control which does not include the post injection for controlling the air-fuel ratio to the target air-fuel ratio. Typically, the PCM 60 only executes the control for causing the main injection with the fuel injection amount corresponding to the target torque. The PCM 60 actually executes the processing of S404, at S106 of the fuel injection control flow illustrated in FIG. 3. Then, the flow returns to S403 to perform the determination again. In other words, if the active DeNO$_x$ control execution flag is "1," the PCM 60 executes the normal fuel injection control while the operating state of the engine remains outside the active DeNO$_x$ execution range R12. When the operation state enters the active DeNO$_x$ execution range R12, the PCM 60 switches the control from the normal fuel injection control to the fuel injection control in the active DeNO$_x$ control. For example, when the operating state of the engine deviates from the active DeNO$_x$ execution range R12 during the fuel injection control in the active DeNO$_x$ control, the PCM 60 suspends the fuel injection control and executes the normal fuel injection control. Then, when the operating state enters the active DeNO$_x$ execution range R12, the PCM 60 resumes the fuel injection control in the active DeNO$_x$ control.

Next, at S405, the PCM 60 determines whether or not the DeNO$_x$ post injection amount acquired at S401 is smaller than the second post injection amount determination value. The second post injection amount determination value is set larger than the first post injection amount determination value (see S306 in FIG. 8). Thus, it is possible to achieve a larger post injection amount in the active DeNO$_x$ control than in the passive DeNO$_x$ control, and the air-fuel ratio becomes controllable to the target air-fuel ratio regardless of the operating state of the engine E (e.g., even when it is not in a state where the air-fuel ratio decreases, such as during acceleration).

If the DeNO$_x$ post injection amount is smaller than the second post injection amount determination value (S405: YES), the flow proceeds to S406 where the PCM 60 controls the fuel injector 20 to perform the post injection with the DeNO$_x$ post injection amount acquired at S401. The PCM 60 actually performs the processing of S406 at S106 of the fuel injection control flow illustrated in FIG. 3. Then the flow proceeds to S409.

On the other hand, if the DeNO$_x$ post injection amount is above the second post injection amount determination value (S405: NO), the flow proceeds to S407. At S407, the PCM 60 reduces the oxygen concentration of air introduced into the engine E so as to control the air-fuel ratio to the target air-fuel ratio by using the post injection amount which is below the second post injection amount determination value (specifically, the second post injection amount determination value itself is applied as the DeNO$_x$ post injection amount). In this case, the PCM 60 executes at least one of a control for narrowing the opening of the intake shutter valve 7, a control for increasing the EGR gas amount, and a control for lowering the turbocharging pressure by the turbocharger 5, so as to reduce the oxygen concentration of the air introduced into the engine E, i.e., reduce the charging amount. For example, the PCM 60 obtains the turbocharging pressure required for controlling the air-fuel ratio to the target air-fuel ratio by using the DeNO$_x$ post injection amount to which the second post injection amount determination value is applied. The PCM 60 reduces the opening of the intake shutter valve 7 to be a desired opening based on the actual turbocharging pressure (the pressure detected by the pressure sensor 108) and the EGR gas amount so as to achieve this turbocharging pressure. Then, the flow proceeds to S408.

It will be noted that the intake shutter valve 7 is fully opened in the normal operating state of the engine E, whereas during DeNO$_x$, DPF regeneration, idle operation, etc., the opening of the intake shutter valve 7 is typically a given basic opening. In the operating state where the EGR gas is not introduced, the intake shutter valve 7 is feedback-controlled based on the turbocharging pressure.

At S408, the PCM 60 controls the fuel injector 20 to perform the post injection by applying the second post injection amount determination value to the DeNO$_x$ post injection amount, i.e., setting the DeNO$_x$ post injection amount to be the second post injection amount determination value. The PCM 60 actually performs the processing of S408 at S106 of the fuel injection control flow illustrated in FIG. 3. Then the flow proceeds to S409.

At S409, the PCM 60 determines whether or not the amount of stored NO$_x$ in the NO$_x$ catalyst approximates zero. For example, the PCM 60 determines whether or not the amount of stored NO$_x$ approximates zero when the amount of stored NO$_x$ estimated based on the operating state of the engine E, the flow rate of the exhaust gas, the temperature of the exhaust gas, etc. approximates zero and the detection value of the NO$_x$ sensor 116 disposed immediately downstream of the DPF 46 changes (S409: YES). Then the flow ends. Here, the PCM 60 ends the active DeNO$_x$ control. The PCM 60 further resets the amount of stored NO$_x$ used in the active DeNO$_x$ control flow and the active DeNO$_x$ control execution flag setting flow in FIG. 7 to zero.

On the other hand, when the amount of stored NO$_x$ does not approximate zero (S409: NO), the flow returns to S403. In this case, the PCM 60 continues the active DeNO$_x$ control. In other words, the PCM 60 continues the active DeNO$_x$ control until the amount of stored NO$_x$ approximates zero. Particularly, even when the execution condition of the active DeNO$_x$ control (e.g., the condition of S403) is not satisfied during the active DeNO$_x$ control and the active DeNO$_x$ control is suspended, when the execution condition of the active DeNO$_x$ control is satisfied thereafter, the PCM 60 promptly resumes the active DeNO$_x$ control to bring the amount of stored NO$_x$ to approximate zero.

Here, the amount of stored NO$_x$ is determinable as approximating zero based on the detection value of the NO$_x$ sensor 116 because of the following reason. Since the NO$_x$ sensor 116 also functions as an oxygen concentration sensor, the detection value of the NO$_x$ sensor 116 corresponds to the air-fuel ratio reaches the NO$_x$ sensor 116. While the NO$_x$ catalyst 45 performs reduction, i.e., when the amount of stored NO$_x$ does not approximate zero, oxygen generated by reducing NO$_x$ reaches the NO$_x$ sensor 116. On the other hand, when the amount of stored NO$_x$ approximates zero, such oxygen generated by reduction no longer reaches the NO$_x$ sensor 116. Therefore, at the timing when the amount of stored NO$_x$ approximates zero, the air-fuel ratio of the exhaust gas that reaches the NO$_x$ sensor 116 decreases, thus the detection value of the NO$_x$ sensor 116 changes.

Figure 10:
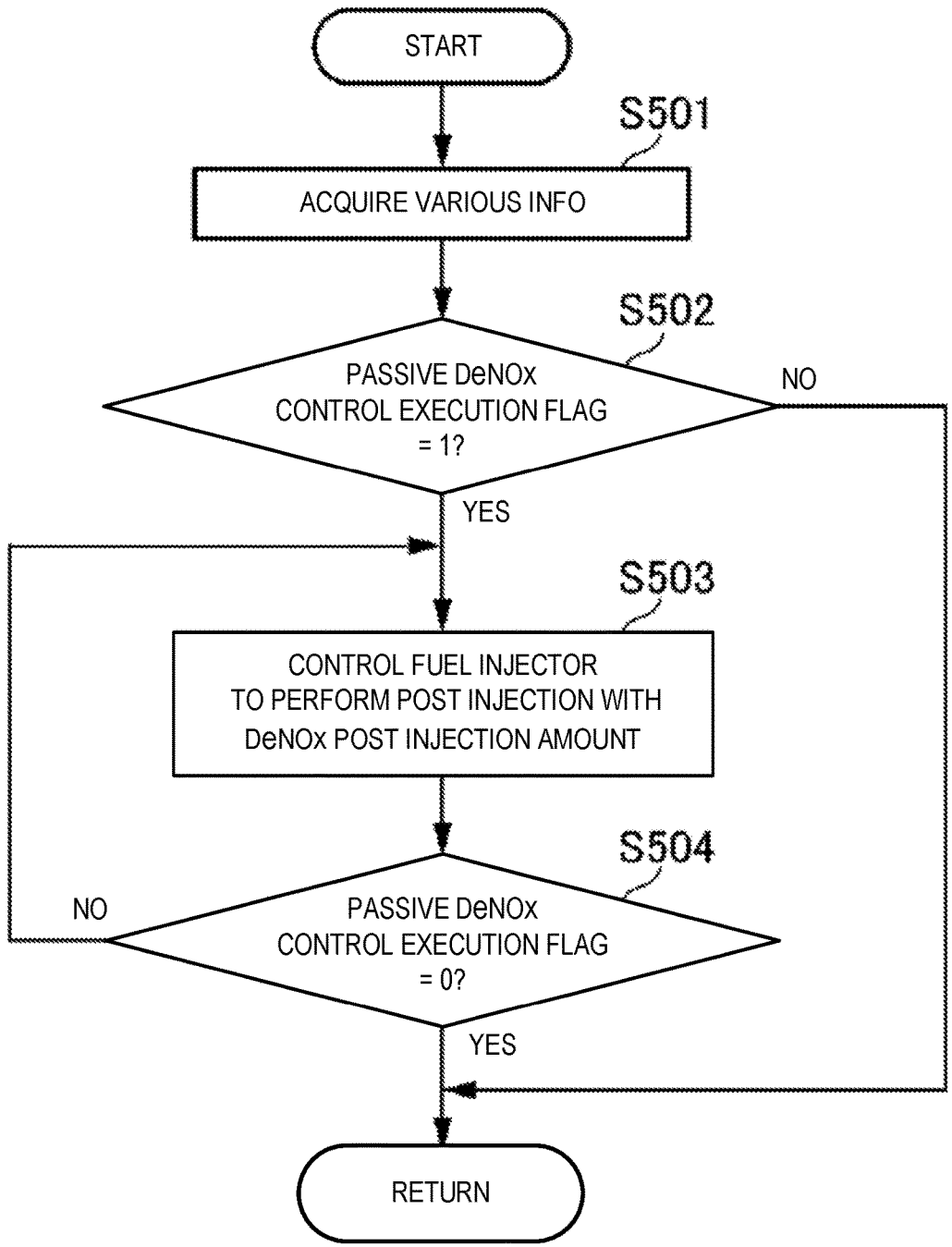
FIG. 10 is a flowchart illustrating the passive $DeNO_x$ control of the embodiment.

Next, the passive DeNO$_x$ control executed based on the passive DeNO$_x$ control execution flag set as described above is described with reference to the flowchart (passive DeNO$_x$ control flow) of FIG. 10. This passive DeNO$_x$ control flow is executed repeatedly at a given cycle by the PCM 60 and is executed in parallel with the fuel injection control flow illustrated in FIG. 3 and the passive DeNO$_x$ control execution flag setting flow illustrated in FIG. 8.

First, at S501, the PCM 60 acquires various information of the vehicle. For example, the PCM 60 acquires at least the DeNO$_x$ post injection amount calculated in the DeNO$_x$ post injection amount calculation flow illustrated in FIG. 5 (specifically, the DeNO$_x$ post injection amount calculated to be applied in the passive DeNO$_x$ control) and the value of the passive DeNO$_x$ control execution flag set in the passive DeNO$_x$ control execution flag setting flow illustrated in FIG. 8.

Next, at S502, the PCM 60 determines whether or not the passive DeNO$_x$ control execution flag acquired at S501 is "1." In other words, the PCM 60 determines whether or not the passive DeNO$_x$ control to be executed. If the passive DeNO$_x$ control execution flag is "1" (S502: YES), the flow proceeds to S503. On the other hand, if the passive DeNO$_x$ control execution flag is "0" (S502: NO), the flow is terminated without executing the passive DeNO$_x$ control.

Next, at S503, the PCM 60 controls the fuel injector 20 to perform the post injection with the DeNO$_x$ post injection amount acquired at S501, i.e., executes the passive DeNO$_x$ control. Actually, the PCM 60 performs the processing of S503 at S106 of the fuel injection control flow illustrated in FIG. 3. Then the flow proceeds to S504.

At S504, the PCM 60 determines whether or not the passive DeNO$_x$ control execution flag is "0." If the passive DeNO$_x$ control execution flag is "0" (S504: YES), the flow ends. In this case, the PCM 60 ends the passive DeNO$_x$ control. On the other hand, if the passive DeNO$_x$ control execution flag is not "0" (S504: NO), i.e., if the passive DeNO$_x$ control execution flag is maintained at "1," the flow returns to S503. In this case, the PCM 60 continues the passive DeNO$_x$ control. In other words, the PCM 60 continues the passive DeNO$_x$ control until the passive DeNO$_x$ control execution flag switches from "1" to "0."

<Estimating Method of Ammonia Adsorption Amount>

Figure 11:
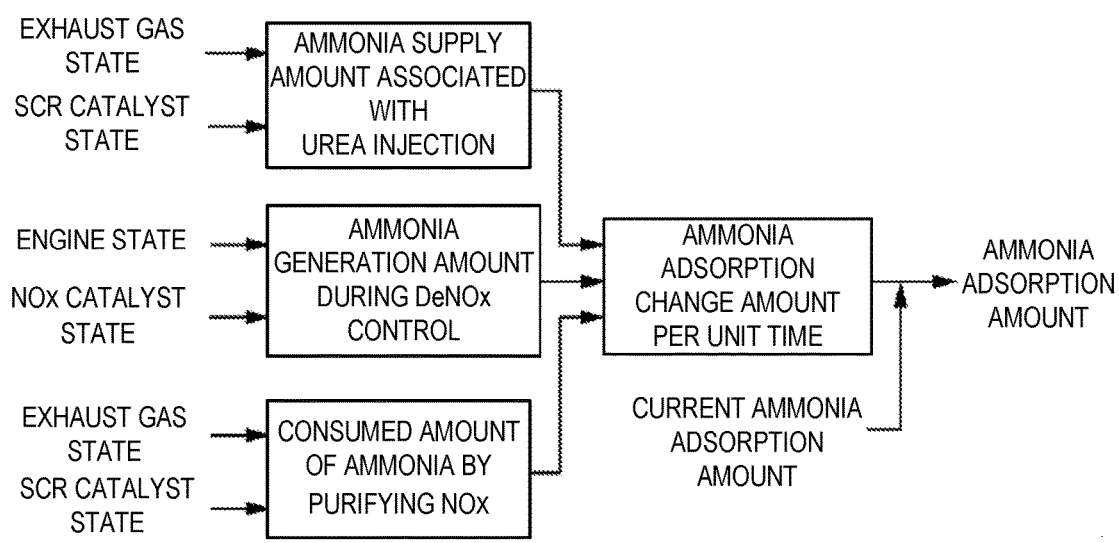
FIG. 11 is a block diagram illustrating a method of estimating an ammonia adsorption amount of the embodiment.

Next, the method of estimating the ammonia adsorption amount in the SCR catalyst 47 in this embodiment is described with reference to the block diagram of FIG. 11. The estimating method of the ammonia adsorption amount is implemented by the PCM 60.

First, the PCM 60 obtains the ammonia supply amount per unit time supplied to the SCR catalyst 47 by the urea injection by the urea injector 51 based on the exhaust gas state (e.g., the exhaust gas amount and the exhaust gas temperature), and the state of the SCR catalyst 47 (e.g., the SCR temperature). Further, the PCM 60 obtains the ammonia generation amount per unit time generated in the NO$_x$ catalyst 45 during the DeNO$_x$ control, based on the operating state of the engine E and the state of the NO$_x$ catalyst 45 (e.g., the NO$_x$ catalyst temperature and the amount of stored NOR). Further, the PCM 60 obtains the consumed amount of ammonia per unit time by reducing and purifying NO$_x$ in the SCR catalyst 47 based on the exhaust gas state (e.g., the exhaust gas amount, the exhaust gas temperature and the NO$_x$ concentration in the exhaust gas), and the state of the SCR catalyst 47 (e.g., the SCR temperature).

Then, the PCM 60 obtains the ammonia adsorption change amount per unit time (amount of change in the ammonia adsorption amount) in the SCR catalyst 47 based on the ammonia supply amount, the ammonia generation amount, and the ammonia consumption amount. For example, the PCM 60 obtains the ammonia adsorption change amount per unit time based on "ammonia supply amount+ammonia generation amount−ammonia consumption amount." Further, the PCM 60 applies the obtained ammonia adsorption change amount to the current ammonia adsorption amount, that is, the previously-estimated ammonia adsorption amount, to obtain the latest ammonia adsorption amount. For example, when the ammonia adsorption change amount is a positive value, the PCM 60 adds the ammonia adsorption change amount to the previously-estimated ammonia adsorption amount to obtain the latest ammonia adsorption amount (here, the ammonia adsorption amount increases). When the ammonia adsorption change amount is a negative value, the PCM 60 subtracts the ammonia adsorption change amount from the previously-estimated ammonia adsorption amount to obtain the latest ammonia adsorption amount (here, the ammonia adsorption amount decreases).

It will be noted that, although the example in which the ammonia adsorption amount of the SCR catalyst 47 is estimated is described above, in another example, the ammonia adsorption amount of the SCR catalyst 47 may be detected using a given sensor.

<Alternative Embodiment of DeNox Control>

Next, a method of calculating the DeNO$_x$ post injection amount" in an alternative embodiment is described with reference to the flowchart (hereinafter, referred to as "DeNO$_x$ post injection amount calculation flow") of FIG. 12. The PCM 60 repeatedly executes the DeNO$_x$ post injection amount calculation flow at a given cycle in parallel with the fuel injection control flow illustrated in FIG. 3. In other words, the DeNO$_x$ post injection amount is calculated as needed during the fuel injection control.

First, at S611, the PCM 60 acquires the operating state of the engine E. For example, the PCM 60 at least acquires the intake air amount (fresh air amount) detected by the airflow sensor 101, the oxygen concentration within the exhaust gas detected by the O2 sensor 111, and the main injection amount calculated at S104 of FIG. 3. The PCM 60 also acquires an exhaust gas amount (EGR gas amount) recirculated to the intake system IN by the EGR device 43, which is obtained based on a given model, and also an ammonia adsorption amount which is an amount of ammonia adsorbed by the SCR catalyst 47. Here, the PCM 60 acquires an estimated ammonia adsorption amount. The method of estimating the ammonia adsorbed amount is described later in detail (see FIG. 11).

Next, at S612, the PCM 60 sets a duration of application of an air-fuel ratio with a high degree of richness as the target air-fuel ratio which is used for reducing NO$_x$ stored in the NO$_x$ catalyst 45 (hereinafter, this duration is referred to as "rich-permitted time"). In this embodiment, when executing the DeNO$_x$ control, the PCM 60 applies a first target air-fuel ratio with a high degree of richness (e.g., 0.96) for the rich-permitted time from the start of the DeNO$_x$ control, and after this rich-permitted time passes, it applies a second target air-fuel ratio leaner than the first target air-fuel ratio within the range where NO$_x$ stored in the NO$_x$ catalyst 45 is reducible (e.g., 0.98). Especially at S612, the PCM 60 sets the rich-permitted time based on the ammonia adsorption amount of the SCR catalyst 47 acquired at S611. The setting method for setting the rich-permitted time is described next in detail with reference to FIG. 13.

Figure 13:
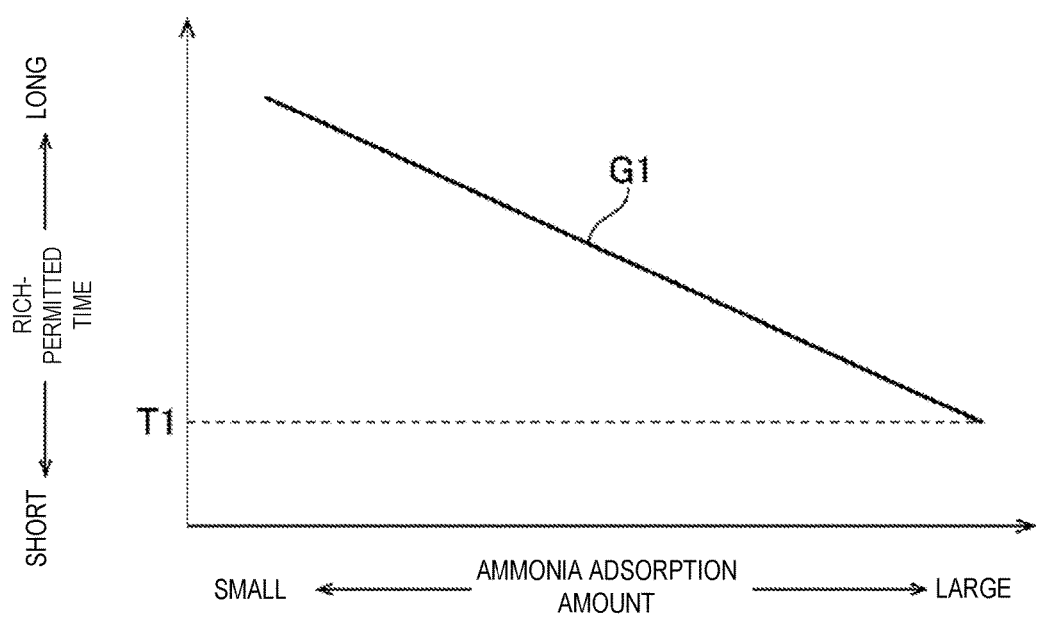
FIG. 13 is a chart illustrating a setting method for setting rich-permitted times according to the alternative embodiment.

In FIG. 13, the horizontal axis indicates the ammonia adsorption amount of the SCR catalyst 47 and the vertical axis indicates the rich-permitted time.

In FIG. 13, a graph G1 indicates the rich-permitted time to be set according to the ammonia adsorption amount of the SCR catalyst 47. This graph G1 corresponds to a map defining the rich-permitted time to be set according to the ammonia adsorption amount. Further a time T1 indicates a shortest time for the rich-permitted time, and time for oxygen stored in the NO$_x$ catalyst 45 to be consumed by the DeNO$_x$ control since the start of the DeNO$_x$ control (e.g., two seconds).

In this embodiment, as illustrated in the graph G1, when the ammonia adsorption amount of the SCR catalyst 47 is at its highest value, the time T1 is applied as the shortest time for the rich-permitted time, and the rich-permitted time is extended as the ammonia adsorption amount of the catalyst 47 decreases. In other words, the rich-permitted time is shortened toward the shortest time T1 as the ammonia adsorption amount of the SCR catalyst 47 increases. In this embodiment, the PCM 60 sets the rich-permitted time according to the ammonia adsorption amount in the above manner, and from the start of the DeNO$_x$ control until the rich-permitted time passes, the PCM 60 executes the DeNO$_x$ control by applying the first air-fuel ratio with the high degree of richness (e.g., 0.96) (see S613 and S614 of FIG. 12). After the rich-permitted time passes, the PCM 60 switches the target air-fuel ratio from the first target air-fuel ratio to the second target air-fuel ratio which is leaner (e.g., 0.98) (see S613 and S615 of FIG. 12), and executes the DeNO$_x$ control by keeping the second target air-fuel ratio. The following is the reason for controlling the target air-fuel ratio in this manner.

Typically, when the DeNO$_x$ control is executed applying the target air-fuel ratio with the high degree of richness, the amount of the reducing agent (e.g., HC) supplied to the NO$_x$ catalyst 45 increases, and although the generation amount of ammonia in the NO$_x$ catalyst 45 increases, the NO$_x$ reduction efficiency in the NO$_x$ catalyst 45 (corresponding to the rate at which NO$_x$ stored in the NO$_x$ catalyst 45 is reduced) is improved. On the other hand, at the start of the DeNO$_x$ control, since "H" in "HC" such as unburned fuel supplied to the NO$_x$ catalyst 45 as the reducing agent by the DeNO$_x$ control is consumed for the reaction with "O" which is oxygen stored in the NO$_x$ catalyst 45 (i.e., oxidation), no ammonia is generated in the NO$_x$ catalyst 45 during this reaction. Therefore, even if the DeNO$_x$ control is executed applying the target air-fuel ratio with the high degree of richness, from the start of the DeNO$_x$ control until the oxygen stored in the NO$_x$ catalyst 45 is consumed, the NO$_x$ catalyst 45 does not release ammonia. In this case, the SCR catalyst 47 naturally does not release ammonia. Furthermore, when the ammonia adsorption amount of the SCR catalyst 47 is small, even if ammonia is released from the NO$_x$ catalyst 45 by the DeNO$_x$ control, it takes time for the ammonia to be released from the SCR catalyst 47 without being adsorbed. Therefore, when the ammonia adsorption amount of the SCR catalyst 47 is small, even after the oxygen stored in the NO$_x$ catalyst 45 is consumed as described above, for a certain period of time, ammonia generated in the NO$_x$ catalyst 45 by the NO$_x$ reduction is not released from the SCR catalyst 47 without being adsorbed.

Figure 12:
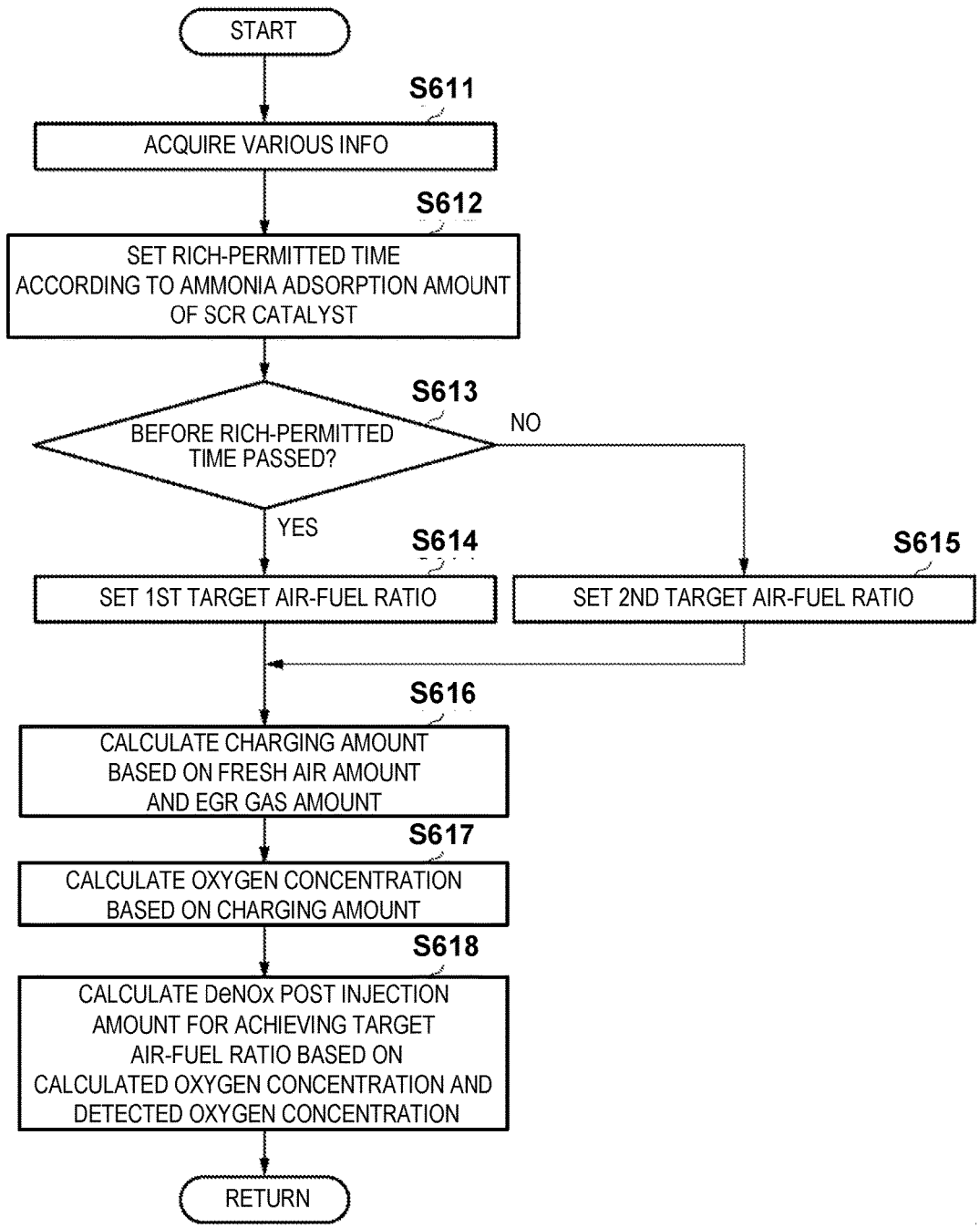
FIG. 12 is a flowchart illustrating a method of calculating the $DeNO_x$ post injection amount according to an alternative embodiment.

Therefore, in this embodiment, the rich-permitted time is set at least longer than the time for oxygen stored in the NO$_x$ catalyst 45 to be consumed by the DeNO$_x$ control according to the ammonia adsorption amount of the SCR catalyst 47, for example, the rich-permitted time is extended longer as the ammonia adsorption amount becomes smaller, and from the start of the DeNO$_x$ control until the rich-permitted time passes, the first target air-fuel ratio with the high degree of richness is applied (see S613 and S614 of FIG. 12). In this manner, the NO$_x$ reduction efficiency of the NO$_x$ catalyst 45 is effectively improved while suitably preventing the ammonia generated in the NO$_x$ catalyst 45 by the NO$_x$ reduction from being released from the SCR catalyst 47 without being adsorbed.

On the other hand, when the DeNO$_x$ control is executed by setting the target air-fuel ratio lean within the range where NO$_x$ stored in the NO$_x$ catalyst 45 is reducible, the amount of the reducing agent supplied to the NO$_x$ catalyst 45 decreases, and although the NO$_x$ reduction efficiency of the NO$_x$ catalyst 45 decreases, the ammonia generation amount in the NO$_x$ catalyst 45 decreases. In other words, by applying such a lean target air-fuel ratio, it is possible to ensure the execution of the DeNO$_x$ control while preventing the release of ammonia from the SCR catalyst 47 due to the DeNO$_x$ control. Therefore, in this embodiment, after the rich-permitted time passes, the target air-fuel ratio is switched from the first target air-fuel ratio to the second target air-fuel ratio leaner thereof (see S615 of FIG. 12), the DeNO$_x$ control is executed by keeping the second target air-fuel ratio.

Here, whether an "N" component desorbed from the NO$_x$ catalyst 45 by the DeNO$_x$ control becomes NO$_2$ or NH$_3$ (ammonia) changes depending on the required amount of the reducing agent. For example, ammonia is easily generated in an atmosphere containing a large amount of the reducing agent, and it becomes difficult to generate ammonia in an atmosphere containing a small amount of the reducing agent. Therefore, even when the total amount of the reducing agent required for the NO$_x$ reduction of the NO$_x$ catalyst 45 is the same, the generation of ammonia in the NO$_x$ catalyst 45 is more reliably prevented when the air-fuel ratio is set lean so as to form the atmosphere with a small amount of reducing agent, than when the air-fuel ratio is set rich so as to form the atmosphere containing a large amount of reducing agent.

It will be noted that the time T1 which is the shortest time for the rich-permitted time described above is typically and preferably set according to the time required from the start of the DeNO$_x$ control until oxygen stored in the NO$_x$ catalyst 45 is consumed. This time varies depending on the oxygen storage capacity (OSC) of the NO$_x$ catalyst 45. For example, the time for oxygen in the NO$_x$ catalyst 45 to be consumed becomes longer as the OSC of the NO$_x$ catalyst 45 increases, and the time for oxygen in the NO$_x$ catalyst 45 to be consumed becomes shorter as the OSC of the NO$_x$ catalyst 45 decreases. In one example, for suitable applications to various OSCs (i.e., in view of safety), considering a case where the oxygen storage capacity is relatively small, the time for oxygen in the NO$_x$ catalyst 45 to be consumed in this case may uniformly be applied to be the time T1 (e.g., two seconds) regardless of the actual OSC. In another example, the OSC of the NO$_x$ catalyst 45 may be actually obtained, and the time T1 may be changed according to the obtained OSC. Here, the amount of oxygen (oxygen concentration) supplied to the NO$_x$ catalyst 45 is obtained based on the intake air amount detected by the airflow sensor 101, and the OSC of the NO$_x$ catalyst 45 may be obtained based on the oxygen amount.

Further, the first target air-fuel ratio applied for the rich-permitted time is preferably set rich within the range where the generation amount of HC corresponding to the post-injected fuel in the DeNO$_x$ control is smaller than a predetermined amount, so as to prevent the blockage of the gas passage by HC during the DeNO$_x$ control. In this case, the first target air-fuel ratio applied when executing the passive DeNO$_x$ control may be set richer than that applied when executing the active DeNO$_x$ control. On the other hand, as described above, the second target air-fuel ratio is preferably set lean within the air-fuel ratio range where the NO$_x$ stored in the NO$_x$ catalyst 45 is reducible.

Further, the change rate (slope) of the rich-permitted time with respect to the ammonia adsorption amount of the SCR catalyst 47 may be determined to improve the NO$_x$ reduction efficiency of the NO$_x$ catalyst 45 by applying the first target air-fuel ratio as long as possible while taking into consideration the possibility of the SCR catalyst 47 releasing, due to the DeNO$_x$ control, ammonia corresponding to the ammonia adsorption amount of the SCR catalyst 47. In this case, in order to reliably prevent the ammonia release from the SCR catalyst 47 due to the DeNO$_x$ control, the change rate of the rich-permitted time with respect to the ammonia adsorption amount of the SCR catalyst 47 is preferably determined with some margin. Moreover, the change rate of the rich-permitted time with respect to the ammonia adsorption amount of the SCR catalyst 47 may be changed based on the SCR temperature. For example, by taking into consideration that the ammonia adsorption performance of the SCR catalyst 47 degrades and it becomes easier for ammonia to be released from the SCR catalyst 47 when the SCR temperature is higher than when it is low, the change rate of the rich-permitted time with respect to the ammonia adsorption amount of the SCR catalyst 47 is preferably lowered to shorten the rich-permitted time applied at the same ammonia adsorption amount. Furthermore, when executing the passive DeNO$_x$ control, compared to when the active DeNO$_x$ control is executed, the change rate of the rich-permitted time with respect to the ammonia adsorption amount of the SCR catalyst 47 may be raised to extend the rich-permitted time applied at the same ammonia adsorption amount. In this manner, the NO$_x$ reduction efficiency of the NO$_x$ catalyst 45 in the passive DeNO$_x$ control, which tends to be executed more frequently than the active DeNO$_x$ control, may be improved to efficiently reduce the NO$_x$ stored amount in the NO$_x$ catalyst 45.

Returning to FIG. 12, the processing steps from S616 are described. At S616, the PCM 60 calculates the air amount introduced into the engine E (i.e., the charging amount) based on the fresh air amount and the EGR gas amount acquired at S611. Then at S617, the PCM 60 calculates the oxygen concentration within the air introduced into the engine E based on the charging amount calculated at S616.

Next, at S618, the PCM 60 calculates the post injection amount (DeNO$_x$ post injection amount) required in achieving the target air-fuel ratio set at S613. In other words, the PCM 60 determines the post injection amount required in addition to the main injection amount in order to bring the air-fuel ratio of the exhaust gas to the target air-fuel ratio.

In this embodiment, the rich-permitted time is set at least longer than the time for oxygen stored in the NO$_x$ catalyst 45 to be consumed by the DeNO$_x$ control, and the DeNO$_x$ control is executed applying the rich first target air-fuel ratio until the rich-permitted time passes. Therefore, the NO$_x$ reduction efficiency of the NO$_x$ catalyst 45 is improved while suitably preventing that ammonia generated in the NO$_x$ catalyst 45 by the NO$_x$ reduction is released from the SCR catalyst 47 without being adsorbed. Especially in this embodiment, the rich-permitted time is extended as the ammonia adsorption amount becomes smaller. Therefore, the NO$_x$ reduction efficiency of the NO$_x$ catalyst 45 is effectively improved. As a result, the NO$_x$ stored amount in the NO$_x$ catalyst 45 is swiftly reduced and the NO$_x$ purification performance of the NO$_x$ catalyst 45 is effectively secured.

Further in this embodiment, after the rich-permitted time described above passes, the DeNO$_x$ control is executed applying the lean second target air-fuel ratio. The execution of the DeNO$_x$ control on the NO$_x$ catalyst 45 is suitably ensured while preventing the release of ammonia from the SCR catalyst 47 due to the DeNO$_x$ control. Therefore, even after the rich-permitted time passes, the NO$_x$ purification performance is suitably secured by reducing the NO$_x$ stored amount in the NO$_x$ catalyst 45.

<Modifications>

In the above embodiment, the rich-permitted time is changed according to the ammonia adsorption amount of the SCR catalyst 47 (see FIG. 13). In another example, the rich-permitted time may not be changed according to the ammonia adsorption amount of the SCR catalyst 47 (i.e., the rich-permitted time may be fixed). In this case, a given time which is at least longer than the time for oxygen stored in the NO$_x$ catalyst 45 to be consumed by the DeNO$_x$ control may be set uniformly as the rich-permitted time regardless of the ammonia adsorption amount. Also in this manner, both preventing the ammonia release from the SCR catalyst 47 due to the DeNO$_x$ control and improving the NO$_x$ reduction efficiency of the NO$_x$ catalyst 45 are reliably achieved.

Further in the above embodiment, both cases of executing the active DeNO$_x$ control and executing the passive DeNO$_x$ control, the rich first target air-fuel ratio is applied until the rich-permitted time passes, and the lean second target air-fuel ratio is applied after the rich-permitted time passes. In another example, the switch of the target air-fuel ratio based on such a rich-permitted time may only be applied to the active DeNO$_x$ control. In this case, when executing the passive DeNO$_x$ control, without switching the target air-fuel ratio based on the rich-permitted time, the target air-fuel ratio may be set according to the ammonia adsorption amount of the SCR catalyst 47 and this target air-fuel ratio may be applied continuously in the passive DeNO$_x$ control. The setting method for setting the target air-fuel ratio is described next in detail with reference to FIG. 14.

Figure 14:
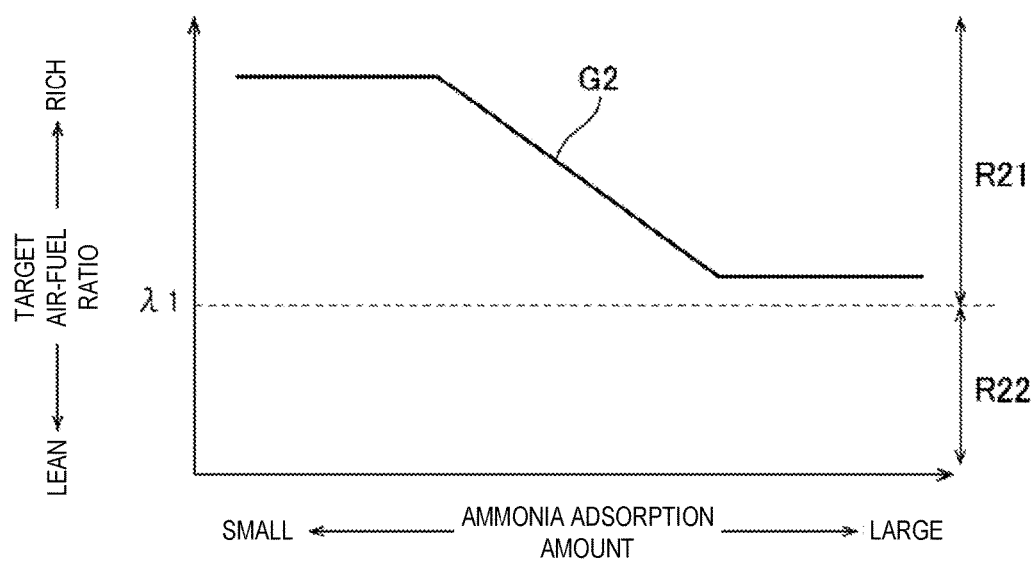
FIG. 14 is a chart illustrating a setting method for setting target air-fuel ratios according to a modification of the alternative embodiment.

In FIG. 14, the horizontal axis indicates the ammonia adsorption amount of the SCR catalyst 47 and the vertical axis indicates the target air-fuel ratio. Further in FIG. 14, "λ1" indicates the theoretical air-fuel ratio, a range R21 on the richer side of the theoretical air-fuel ratio λ1 indicates the air-fuel ratio range where the NO$_x$ stored in the NO$_x$ catalyst 45 is reducible, and a range R22 on the leaner side of the theoretical air-fuel ratio λ1 indicates the air-fuel ratio range where the NO$_x$ stored in the NO$_x$ catalyst 45 is not reducible. The graph G2 indicates the target air-fuel ratio to be set according to the ammonia adsorption amount of the SCR catalyst 47 when executing the passive DeNO$_x$ control, which corresponds to a map defining the target air-fuel ratio to be set according to the ammonia adsorption amount.

As illustrated in the graph G2, when executing the passive DeNO$_x$ control, as the ammonia adsorption amount of the SCR catalyst 47 increases, the target air-fuel ratio is preferably set lean within the air-fuel ratio range where the NO$_x$ stored in the NO$_x$ catalyst 45 is reducible (range R21), e.g., around 0.98. Thus, when the ammonia adsorption amount of the SCR catalyst 47 is large, the execution of the DeNO$_x$ control on the NO$_x$ catalyst 45 is suitably ensured while preventing the release of ammonia from the SCR catalyst 47 due to the DeNO$_x$ control. On the other hand, as illustrated in the graph G2, the target air-fuel ratio may be set richer as the ammonia adsorption of the SCR catalyst 47 reduces (e.g., the air-fuel ratio of around 0.96). As a result, the NO$_x$ reduction efficiency of the NO$_x$ catalyst 45 by the passive DeNO$_x$ control is effectively improved, the NO$_x$ stored amount in the NO$_x$ catalyst 45 is swiftly reduced, and the NO$_x$ purification performance of the NO$_x$ catalyst 45 is effectively secured.

<Operation and Effects>

Next, the operation and effects of the exhaust emission control system of the engine of this embodiment are described.

According to this embodiment, the target air-fuel ratio applied in the DeNO$_x$ control is set based on the ammonia adsorption amount in the SCR catalyst 47. For example, the target air-fuel ratio is set leaner as the ammonia adsorption amount increases. Thus, when the ammonia adsorption amount in the SCR catalyst 47 is large, the DeNO$_x$ control of the NO$_x$ catalyst 45 is suitably ensured while preventing the release of ammonia from the SCR catalyst 47 caused by the DeNO$_x$ control. Therefore, even when the ammonia adsorption amount of the SCR catalyst 47 is large, the amount of stored NO$_x$ in the NO$_x$ catalyst 45 is reduced to suitably ensure the NO$_x$ purification performance of the NO$_x$ catalyst 45. On the other hand, when the ammonia adsorption amount of the SCR catalyst 47 is small, the possibility of ammonia being released from the SCR catalyst 47 due to the DeNO$_x$ control is considered low, and the rich target air-fuel ratio is applied to the DeNO$_x$ control so as to improve the NO$_x$ reduction efficiency of the NO$_x$ catalyst 45 in the DeNO$_x$ control. As a result, the amount of stored NO$_x$ in the $NO_x$ catalyst 45 is swiftly reduced to effectively ensure the $NO_x$ purification performance of the $NO_x$ catalyst 45.

By applying such a target air-fuel ratio to the active $DeNO_x$ control, the active $DeNO_x$ control is reliably executed even when the ammonia adsorption amount of the SCR catalyst 47 is large. Therefore, the amount of stored $NO_x$ in the $NO_x$ catalyst is reliably reduced by the $DeNO_x$ control while preventing the release of ammonia from the SCR catalyst 47 caused by the $DeNO_x$ control. Similarly, even when the target air-fuel ratio described above is applied to the passive $DeNO_x$ control, the passive $DeNO_x$ control is reliably executed regardless of the ammonia adsorption amount of the SCR catalyst 47. Therefore, the amount of stored $NO_x$ in the $NO_x$ catalyst is efficiently reduced while preventing the fuel consumption increase.

Further, in this embodiment, the target air-fuel ratio is set richer in the passive $DeNO_x$ control than in the active $DeNO_x$ control when the ammonia adsorption amount is the same. Therefore, the $NO_x$ reduction efficiency of the $NO_x$ catalyst 45 in the passive $DeNO_x$ control is suitably improved.

Further, in this embodiment, a substantially fixed target air-fuel ratio is applied over a relatively wide range where the ammonia adsorption amount of the SCR catalyst 47 is large. Therefore, the release of ammonia from the SCR catalyst 47 caused by the $DeNO_x$ control is reliably prevented regardless of the ammonia adsorption performance of the SCR catalyst 47 which changes in various situations.

Further, in this embodiment, the target air-fuel ratio is set leaner when the SCR temperature is high than when the SCR temperature is low in the case where the ammonia adsorption amount is the same. Therefore, when the SCR temperature is high, although usually the ammonia adsorption performance of the SCR catalyst 47 degrades and it becomes easy for ammonia to be released from the SCR catalyst 47, by setting the lean target air-fuel ratio here, the release of ammonia from the SCR catalyst 47 caused by the $DeNO_x$ control is reliably prevented. On the other hand, when the SCR temperature is low, since it becomes hard for ammonia to be released from the SCR catalyst 47, by setting the rich target air-fuel ratio here, the $NO_x$ reduction efficiency of the $NO_x$ catalyst 45 is suitably improved.

Further, in this embodiment, the ammonia adsorption amount of the SCR catalyst 47 is estimated accurately based on the ammonia supply amount to the SCR catalyst 47 by the urea injection from the urea injector 51, the ammonia generation amount in the $NO_x$ catalyst 45 by the $DeNO_x$ control, and the consumption amount of ammonia for the reduction and purification of $NO_x$ by the SCR catalyst 47.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. An exhaust emission control system of an engine, including an $NO_x$ catalyst disposed in an exhaust passage of the engine for storing $NO_x$ within exhaust gas when an air-fuel ratio of the exhaust gas is lean, and reducing the stored $NO_x$ when the air-fuel ratio is stoichiometric or rich, the system comprising:
   an SCR catalyst disposed in the exhaust passage downstream of the $NO_x$ catalyst and configured to purify $NO_x$ within exhaust gas by causing a reaction with ammonia; and
   a controller, wherein
   the controller is configured to execute an $NO_x$ reduction controlling module for executing an $NO_x$ reduction control in which the air-fuel ratio is controlled to a target air-fuel ratio so that the stored $NO_x$ is reduced, the target air-fuel ratio being a ratio at which the stored $NO_x$ is reducible;
   the $NO_x$ reduction controlling module sets a first air-fuel ratio that is rich as the target air-fuel ratio until a predetermined time period passes from start of the $NO_x$ reduction control, and sets a second air-fuel ratio as the target air-fuel ratio, the second air-fuel ratio being leaner than the first air-fuel ratio within a range where the stored $NO_x$ is reducible, the predetermined time period being at least longer than a time period from the start of the $NO_x$ reduction control until oxygen stored in the $NO_x$ catalyst is consumed by the $NO_x$ reduction control;
   the $NO_x$ reduction controlling module executes, as the $NO_x$ reduction control, (1) a first $NO_x$ reduction control in which the air-fuel ratio is controlled to the target air-fuel ratio when the air-fuel ratio becomes rich due to acceleration of a vehicle, and (2) a second $NO_x$ reduction control in which the air-fuel ratio is controlled to the target air-fuel ratio so that an amount of $NO_x$ stored in the $NO_x$ catalyst falls below a predetermined amount by reducing the $NO_x$ stored in the $NO_x$ catalyst when the amount of $NO_x$ stored in the $NO_x$ catalyst is above the predetermined amount regardless of whether or not the air-fuel ratio becomes rich due to acceleration of the vehicle; and
   the $NO_x$ reduction controlling module extends the predetermined time period to be longer in the first $NO_x$ reduction control than in the second $NO_x$ reduction control.

2. The system of claim 1, wherein
   the controller is configured to further execute an ammonia adsorption amount acquiring module for acquiring an ammonia adsorption amount of the SCR catalyst by one of detection and estimation; and
   the $NO_x$ reduction controlling module sets the predetermined time period based on the ammonia adsorption amount acquired by the ammonia adsorption amount acquiring module.

3. The system of claim 2, wherein the $NO_x$ reduction controlling module shortens the predetermined time period as the ammonia adsorption amount increases.

4. The system of claim 3, wherein the $NO_x$ reduction controlling module sets a given time for the predetermined time period as the time from the start of the $NO_x$ reduction control until oxygen stored in the $NO_x$ catalyst is consumed by the $NO_x$ reduction control, and extends the predetermined time period from the given time as the ammonia adsorption amount decreases.

5. The system of claim 1, wherein when the $NO_x$ stored amount in the $NO_x$ catalyst is above the predetermined amount, the $NO_x$ reduction controlling module continuously executes the $NO_x$ reduction control to control the air-fuel ratio to the target air-fuel ratio so that the amount of $NO_x$ stored in the NO, catalyst amount falls below the predetermined amount by reducing the $NO_x$ stored in the $NO_x$ catalyst.

6. The system of claim 1, wherein,
   only when the second $NO_x$ reduction control is executed, the $NO_x$ reduction controlling module sets the first air-fuel ratio as the target air-fuel ratio for the predetermined time period from the start of the second $NO_x$ reduction control, and then sets the second air-fuel ratio as the target air-fuel ratio after the predetermined time period has passed.

7. The system of claim 6, wherein when the first $NO_x$ reduction control is executed, the $NO_x$ reduction controlling module continuously controls the air-fuel ratio to the target air-fuel ratio according to an ammonia adsorption amount of the SCR catalyst, the target air-fuel ratio being set leaner within the range where the stored $NO_x$ is reducible, as the ammonia adsorption amount increases.

8. An exhaust emission control system of an engine, including an $NO_x$ catalyst disposed in an exhaust passage of the engine and configured to store $NO_x$ within exhaust gas when an air-fuel ratio of the exhaust gas is lean, and reducing the stored $NO_x$ when the air-fuel ratio is stoichiometric or rich, the system comprising:
an SCR catalyst disposed in the exhaust passage downstream of the $NO_x$ catalyst and configured to purify $NO_x$ within exhaust gas by causing a reaction with ammonia; and
a controller, wherein
the controller is configured to execute an $NO_x$ reduction controlling module for executing an $NO_x$ reduction control in which the air-fuel ratio is controlled to a target air-fuel ratio so that the stored $NO_x$ is reduced, the target air-fuel ratio being a ratio at which the stored $NO_x$ is reducible;
the controller is configured to further execute an ammonia adsorption amount acquiring module for acquiring an ammonia adsorption amount of the SCR catalyst by one of detection and estimation;
the $NO_x$ reduction controlling module controls the target air-fuel ratio to be leaner as the ammonia adsorption amount increases;
the $NO_x$ reduction controlling module executes, as the $NO_x$ reduction control, (1) a first $NO_x$ reduction control in which the air-fuel ratio is temporarily controlled to the target air-fuel ratio when the air-fuel ratio becomes rich due to acceleration of a vehicle, and (2) a second $NO_x$ reduction control in which the air-fuel ratio is continuously controlled to the target air-fuel ratio so that an amount of stored $NO_x$ falls below a predetermined amount by reducing the $NO_x$ stored in the $NO_x$ catalyst when the amount of stored $NO_x$ in the $NO_x$ catalyst is above the predetermined amount regardless of whether or not the air-fuel ratio becomes rich due to acceleration of the vehicle; and
the $NO_x$ reduction controlling module executes the first $NO_x$ reduction control so as to control the target air-fuel ratio to be richer in the first $NO_x$ reduction control than in the second $NO_x$ reduction control for the same ammonia adsorption amount.

9. The system of claim 8, wherein
when the amount of the stored $NO_x$ in the $NO_x$ catalyst is above the predetermined amount, the $NO_x$ reduction controlling module executes the $NO_x$ reduction control to continuously control the air-fuel ratio to the target air-fuel ratio so that the amount of the stored $NO_x$ falls below the predetermined amount by reducing the $NO_x$ stored in the $NO_x$ catalyst.

10. The system of claim 8, wherein
the $NO_x$ reduction controlling module executes the $NO_x$ reduction control to temporarily control the air-fuel ratio to the target air-fuel ratio when the air-fuel ratio becomes rich due to acceleration of the vehicle.

11. The system of claim 8, wherein the $NO_x$ reduction controlling module controls the target air-fuel ratio to be leaner as the ammonia adsorption amount increases.

12. The system of claim 8, wherein the $NO_x$ reduction controlling module controls the target air-fuel ratio to be substantially fixed when the ammonia adsorption amount is above a predetermined adsorption amount.

13. The system of claim 8, wherein the $NO_x$ reduction controlling module controls the target air-fuel ratio to be leaner as a temperature of the SCR catalyst increases at the same ammonia adsorption amount.

14. The system of claim 8, further comprising:
a urea injector disposed in the exhaust passage upstream of the SCR catalyst and configured to inject urea into the exhaust passage, wherein
the SCR catalyst purifies $NO_x$ by using ammonia generated from urea injected by the urea injector; and
the ammonia adsorption amount acquiring module estimates the ammonia adsorption amount based on an amount of ammonia supplied to the SCR catalyst by the urea injection by the urea injector, an amount of ammonia generated in the $NO_x$ catalyst by the $NO_x$ reduction control, and an amount of ammonia consumed by the SCR catalyst to purify $NO_x$.

* * * * *